United States Patent
Shih et al.

(10) Patent No.: US 8,860,701 B2
(45) Date of Patent: Oct. 14, 2014

(54) CONTROL METHOD FOR BI-STABLE DISPLAYING, TIMING CONTROLLER, AND BI-STABLE DISPLAY DEVICE WITH SUCH TIMING CONTROLLER

(75) Inventors: Chien-Chia Shih, Hsinchu (TW); Gin-Yen Lee, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 495 days.

(21) Appl. No.: 13/161,509

(22) Filed: Jun. 16, 2011

(65) Prior Publication Data

US 2012/0194532 A1 Aug. 2, 2012

(30) Foreign Application Priority Data

Jan. 28, 2011 (TW) .............................. 100103460 A

(51) Int. Cl.
*G06F 3/038* (2013.01)
*G09G 5/00* (2006.01)
*G06F 15/80* (2006.01)
*G09G 5/36* (2006.01)

(52) U.S. Cl.
USPC ............ 345/204; 345/505; 345/545; 345/559

(58) Field of Classification Search
None
See application file for complete search history.

(56) References Cited

U.S. PATENT DOCUMENTS

| | | | | |
|---|---|---|---|---|
| 7,804,483 B2 * | 9/2010 | Zhou et al. | ..................... | 345/107 |
| 2007/0205978 A1 | 9/2007 | Zhou et al. | | |
| 2008/0072163 A1* | 3/2008 | Teng et al. | ..................... | 715/761 |
| 2009/0256868 A1 | 10/2009 | Low et al. | | |
| 2010/0277509 A1* | 11/2010 | Lu et al. | ..................... | 345/690 |
| 2011/0310980 A1* | 12/2011 | Mathew | .................. | 375/240.26 |

FOREIGN PATENT DOCUMENTS

| | | |
|---|---|---|
| CN | 101295496 | 10/2008 |
| CN | 101308631 | 11/2008 |
| CN | 101887695 | 11/2010 |
| TW | 200612222 | 4/2006 |
| TW | 200828236 | 7/2008 |
| TW | 201015396 | 4/2010 |
| TW | 201039311 | 11/2010 |

OTHER PUBLICATIONS

Andrés Iglesias, "Computer-Aided Geometric Design and Computer Graphics: Line Drawing Algorithms", Department of Applied Mathematics and computational Sciences University of Cantabria UC-CAGD Group, 2001, pp. 1-13.

(Continued)

*Primary Examiner* — Maurice L McDowell, Jr.
*Assistant Examiner* — Donna J Ricks
(74) *Attorney, Agent, or Firm* — Jianq Chyun IP Office

(57) ABSTRACT

A control method for bi-stable displaying is provided, using queues for storing coordinates to achieve pipeline parallel processing on display data, thereby increasing display speed. In a preceding stage of the display process, because a plurality of queues may be used for temporarily storing part of the display data which is then reconstructed into complete display data to update a current frame buffer, comparing pixel data and generating driving data can be simultaneously preformed upon a plurality of line segments. Moreover, in a succeeding stage of the display process, a similar process may be performed to update a previous frame buffer, so access time can be reduced and errors caused by overlapping image blocks can also be avoided. Furthermore, the method may be also applied to a timing controller and a bi-stable display device.

21 Claims, 20 Drawing Sheets

(56) References Cited

OTHER PUBLICATIONS

"Office Action of Taiwan Counterpart Application", issued on Oct. 24, 2013, p. 1-p. 7, in which the listed references were cited.

"Office Action of China Counterpart Application", issued on Dec. 2, 2013, p. 1-p. 10, in which the listed references were cited.

"Office Action of Taiwan Counterpart Application", issued on Jan. 27, 2014, p. 1-p. 14, in which the listed references were cited.

* cited by examiner

CONTROL METHOD FOR BI-STABLE DISPLAYING, TIMING CONTROLLER, AND BI-STABLE DISPLAY DEVICE WITH SUCH TIMING CONTROLLER

CROSS-REFERENCE TO RELATED APPLICATION

This application claims the priority benefit of Taiwan application serial no. 100103460, filed Jan. 28, 2011. The entirety of the above-mentioned patent application is hereby incorporated by reference herein and made a part of this specification.

BACKGROUND OF THE INVENTION

1. Field of the Invention

The present invention generally relates to a control technology for bi-stable displaying, in particular, to a control method for bi-stable displaying which adopts a queue architecture and is capable of improving display speed and quality, and a timing controller (TCON) and a display control device applying the method.

2. Description of Related Art

As far as current display technologies are concerned, besides large-scale display technologies generally applied to household or end consumers, such as liquid crystal displays, plasma displays, or conventional cathode-ray tube televisions, flexible display technologies adopting new generation materials tend to be gradually attracting attention. In current various display technologies, a bi-stable display technology attracts the most attention next to an organic light emitting diode (OLED) display technology. The bi-stable display technology has been universally applied to electronic book technologies up to the present. Through persistent development, it tends to become a new generation flexible display to replace paper in future. Currently, several different bi-stable display technologies, i.e., cholesteric liquid crystal and electronic ink (e-ink) technologies, have been developed, both being current mainstream technologies.

As the name implies, bi-stable means that a display cell is capable of persistently maintaining either of two different states, namely, a bright state and a dark state, without any voltage applied. In other words, the bi-stable technology enables picture memorization with no voltage applied, thereby having an advantage of low power consumption. In an ideal state, a display of the bi-stable technology may save up to hundreds of times of electric quantity as compared with the conventional liquid crystal display technology, and thus is quite suitable to be applied in occasions without the need of frequently updating a picture, such as mobile phones, electronic books, and even large-scale electronic display boards.

Referring to FIG. 1, it is a schematic block diagram of a basic architecture of a conventional bi-stable display device. A timing controller (TCON) 130 mainly used for controlling all input and output timings is disposed in the conventional bi-stable display device 100. The TCON 130 receives image data sent by a central processing unit (CPU) 110 through a host interface 120.

Moreover, the TCON 130 is coupled to a memory 150. The memory 150 is divided into a current frame buffer 152 and a previous frame buffer 154. The current frame buffer 152 is used for temporarily storing display data (such as including color data of a pixel) of an image to be displayed currently, while the previous frame buffer 154 is used for temporarily storing display data (such as including color data of a pixel) of an image that has been completely displayed on a panel 170.

Moreover, the conventional bi-stable display device 100 further includes a look up table (LUT) 140, which is used for recording all possible driving voltage waveforms. The content of the LUT 140 usually includes all possible combinations of previous display data and current display data, and driving voltage data corresponding to all the possible combinations respectively. In this way, the TCON 130 may obtain driving voltage data of each pixel in an image by referring to the LUT 140 according to previous and current display data of each pixel stored in the memory 150.

Moreover, the TCON 130 is also connected to a driving circuit 172 through a display interface 160 and a transmission line 162. After obtaining the driving voltage data, the TCON 130 may provide the driving voltage data to the driving circuit 172 through the display interface 160 and the transmission line 162. Accordingly, the driving circuit 172 is capable of generating a corresponding driving voltage to drive the panel 170 to display an image. For example, the driving voltage data of "00b" or "11b" represents that the driving voltage is 0 V; the driving voltage data of "01b" represents that the driving voltage is +15 V; and the driving voltage data of "10b" represents that the driving voltage is −15 V.

Referring to FIGS. 2A and 2B, they are respectively waveform diagrams of driving voltages generated by the driving circuit 172 respectively when a black picture and a white picture are displayed. As shown in FIGS. 2A and 2B, the driving voltages generated by the black picture and the white picture respectively are maintained at +15 V and −15 V during a complete update time T0. The complete update time T0 represents a time for replacing an entire picture, while a time T1 represents a frame execution time. The complete update time T0 is integer times of the frame execution time T1. For example, T0 is about 260 milliseconds (ms), while T1 is about 20 ms.

Operating principles of elements in the conventional bi-stable display device 100 are illustrated in detail hereinafter by taking display of a black image as an example first. First, referring to FIG. 3A, it illustrates an image format of a black image received by the TCON 130. As shown in FIG. 3A, this black image is presented as a rectangular area, and format data of the image includes data such as starting point coordinates (X1, Y1) of this rectangular area R, image pixels, an image width (W), and an image length (L).

Then, referring to FIG. 3B, it includes FIGS. 3B-1 to 3B-3 for illustrating the content stored in the current frame buffer 152 and the previous frame buffer 154 and the content displayed on the panel 170 of the black image in FIG. 3A in different stages of processing and display processes. It is assumed that both the current frame buffer 152 and the previous frame buffer 154 are blank at the beginning, as shown in FIG. 3B-1.

Next, after receiving the display data of the rectangular area R from the host interface 120, the ICON 130 firstly stores the display data (including a data amount of W×L pixels) of this rectangular area R into the current frame buffer 152, as shown in FIG. 3B-2.

Next, the TCON 130 obtains driving data required for displaying each pixel of the rectangular area R by referring to the LUT 140 according to pixel data of all corresponding addresses in the current frame buffer 152 and the previous frame buffer 154, and transfers the driving data to the display interface 160 to drive the panel 170. Therefore, after one frame execution time T1 elapses, the panel 170 initially displays a black image (in a light color) of the rectangular area R. Next, the step from referring to the LUT 140 to driving the panel 170 is repeated with one frame execution time T1 spent every time, so as to gradually enhance the color of the displayed image. Until one complete update time T0 elapses, the panel 170 completely displays a black image (in a dark color) of the rectangular area R, as shown in FIG. 3B-3.

Finally, the TCON 130 replicates the display data stored in the current frame buffer 152 to a relative position of the previous frame buffer 154, so as to update the previous frame buffer 154, as shown in FIG. 3B-3 likewise.

Operating principles of the elements are further illustrated hereinafter when the conventional bi-stable display device 100 realizes such functions as pen drawing or handwriting. First, referring to FIG. 4A, it shows an example of a pen drawn image received by the TCON 130. As shown in FIG. 4A, it is assumed that a user draws three consecutive line segments in sequence with a pen: a line segment 1, a line segment 2, and a line segment 3.

Referring to FIGS. 4B-1 and 4B-2, they include FIGS. (a) to (e) for illustrating the content stored in the current frame buffer 152 and the previous frame buffer 154 and the content displayed on the panel 170 of the pen drawn image in FIG. 4A in different stages of processing and display processes. Firstly, it is assumed that both the current frame buffer 152 and the previous frame buffer 154 are blank at the beginning, as shown in FIG. (a). The CPU 110 transfers the line segment 1 as an area image to the TCON 130, so a data amount of all pixels (W1×L1) in a rectangular area R1 must be transferred.

After receiving the display data of the rectangular area R1 including the line segment 1, the TCON 130 firstly stores the display data into the current frame buffer 152, as shown in FIG. (b).

Next, the TCON 130 obtains driving data for displaying each pixel in the rectangular area R1 by referring to the LUT 140 according to display data of corresponding addresses in the current frame buffer 152 and the previous frame buffer 154, and transfers the driving data to the display interface 160 to drive the panel 170. After the step from referring to the LUT 140 to driving the panel 170 is repeated for a complete update time T0, the panel 170 completely displays the line segment 1, as shown in FIG. (c). Afterwards, the TCON 130 replicates the display data of the rectangular area R1 of the current frame buffer 152 to corresponding addresses of the previous frame buffer 154, as shown in FIG. (c) likewise.

Afterwards, the TCON 130 also receives the line segment 2. Similar to the processing and display processes of the line segment 1, the TCON 130 sequentially performs the following steps likewise. Firstly, the received display data (including a data amount of W2×L2 pixels) of a rectangular area R2 is stored into the current frame buffer 152, as shown in FIG. (c) likewise. Subsequently, driving data of each pixel of the rectangular area R2 is obtained by referring to the LUT 140, and the step is repeated for a complete update time T0 until the line segment 2 is completely displayed on the panel 170, a result of which is as shown in FIG. (d). Finally, after the line segment 2 is completely displayed, the display data of the rectangular area R2 is replicated from the current frame buffer 152 to the previous frame buffer 154, as shown in FIG. (d) likewise.

Afterwards, the TCON 130 also receives the line segment 3. Similar to the processing and display processes of the line segment 1 and the line segment 2, the TCON 130 sequentially performs the following procedures likewise. The display data (including a data amount of W3×L3 pixels) of a rectangular area R3 is stored into the current frame buffer 152, as shown in FIG. (d) likewise; the step of obtaining the driving data by referring to the LUT to drive the panel 170 is repeated for a complete update time T0, and then the line segment 3 is completely displayed, as shown in FIG. (e); and the display data is replicated to the previous frame buffer 154, as shown in FIG. (e) likewise.

However, when the pen drawing or handwriting function is executed by using the above procedures, each line segment is regarded as an area image to be processed in each processing step, so a large amount of display data is generated in each step. Moreover, only after the updating of the current frame buffer 152, comparison, and display are performed for the each line segment, the updating, comparison, and display can be continued for a next line segment. In other words, only after each line segment is processed for one complete update time T0, the processing procedure can be proceeded to process a next line segment. As a result, the driving data at any time can only include relevant driving data of a single line segment. When pen drawing or handwriting is rapidly performed, a picture is displayed too slowly, and a smooth line segment cannot be presented.

SUMMARY OF THE INVENTION

In an aspect, the present invention provides a control method for bi-stable displaying, which includes: temporarily storing first display data of an image, in which the image is input from a bi-stable panel, and the image includes one or more line segments; and performing parallel processing on the first display data of the respective one or more line segments, so as to generate driving data of the one or more line segments in parallel.

In an embodiment, the method includes temporarily storing the first display data belonging to the respective one or more line segments into one or more queues respectively, so as to perform parallel processing on the first display data temporarily stored in the respective one or more queues.

Moreover, in the step of performing parallel processing to generate the driving data of the image, preferably, a current frame buffer may be updated according to the first display data temporarily stored in the respective one or more queues respectively; and after the update step is executed every time, the driving data is generated according to display data stored in both the current frame buffer updated this time and a previous frame buffer that is not updated.

More preferably, the step of updating the current frame buffer every time may include: obtaining second display data according to the first display data temporarily stored in one of the one or more queues, and storing the second display data into the current frame buffer after the second display data is obtained every time. The first display data temporarily stored in the one or more queues may include at least part of coordinate data of the respective one or more line segments respectively. The second display data obtained every time may include complete coordinate data of one of the one or more line segments respectively.

Similarly, the method preferably may further include updating the previous frame buffer according to the first display data temporarily stored in the one or more queues. More preferably, third display data may be obtained according to the first display data temporarily stored in the respective one or more queues respectively, and the third display data may be stored into the previous frame buffer after the third display data is obtained every time. Likewise, the third display data obtained every time may include complete coordinate data of one of the one or more line segments respectively.

In another aspect, the present invention provides a control method for bi-stable displaying, which includes: receiving display data of a plurality of consecutive line segments from a bi-stable panel and generating corresponding driving data;

and displaying the one or more line segments on the bi-stable panel according to the driving data, in which each of the one or more line segments is displayed repeatedly, and respective repeated display times of two adjacent line segments are overlapping.

In a further aspect, the present invention provides a TCON, which includes: a host interface, for receiving an image input from a bi-stable panel, in which the image includes one or more line segments; and a main control module, for temporarily storing first display data of the image, and performing parallel processing on the first display data of the respective one or more line segments, so as to generate driving data of the one or more line segments in parallel.

In a still another aspect, the present invention provides a bi-stable display device applying the TCON, which includes the TCON, and a panel for repeatedly displaying each line segment in the image according to the driving data, in which respective repeated display times of two consecutive line segments in the image are overlapping.

In a yet another aspect, the present invention provides a bi-stable display device, which includes: a TCON, for receiving display data of a plurality of consecutive line segments and generating corresponding driving data; and a bi-stable panel, for receiving input of the plurality of line segments, and displaying the one or more line segments according to the driving data, in which the bi-stable panel repeatedly displays each of the one or more line segments, and respective repeated display times of two adjacent line segments are overlapping.

In the above various aspects provided, because pipeline parallel processing is performed on the display data, the display speed can be increased. In a preceding stage of the display process, because a plurality of queues can be used for temporarily storing part of the display data which is then reconstructed into complete display data to update a current frame buffer, comparing pixel data and generating driving data can be simultaneously performed upon a plurality of line segments. Moreover, in a succeeding stage of the display process, a similar process may be performed to update a previous frame buffer, so access time can be reduced and errors caused by overlapping image blocks can also be avoided.

In order to make the aforementioned and other features and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 4B-1 and 4B-2 are is schematic views of examples of storage content of a current frame buffer and a previous frame buffer and display content of a panel corresponding to FIG. 4A.

DESCRIPTION OF THE EMBODIMENTS

Figure 1:
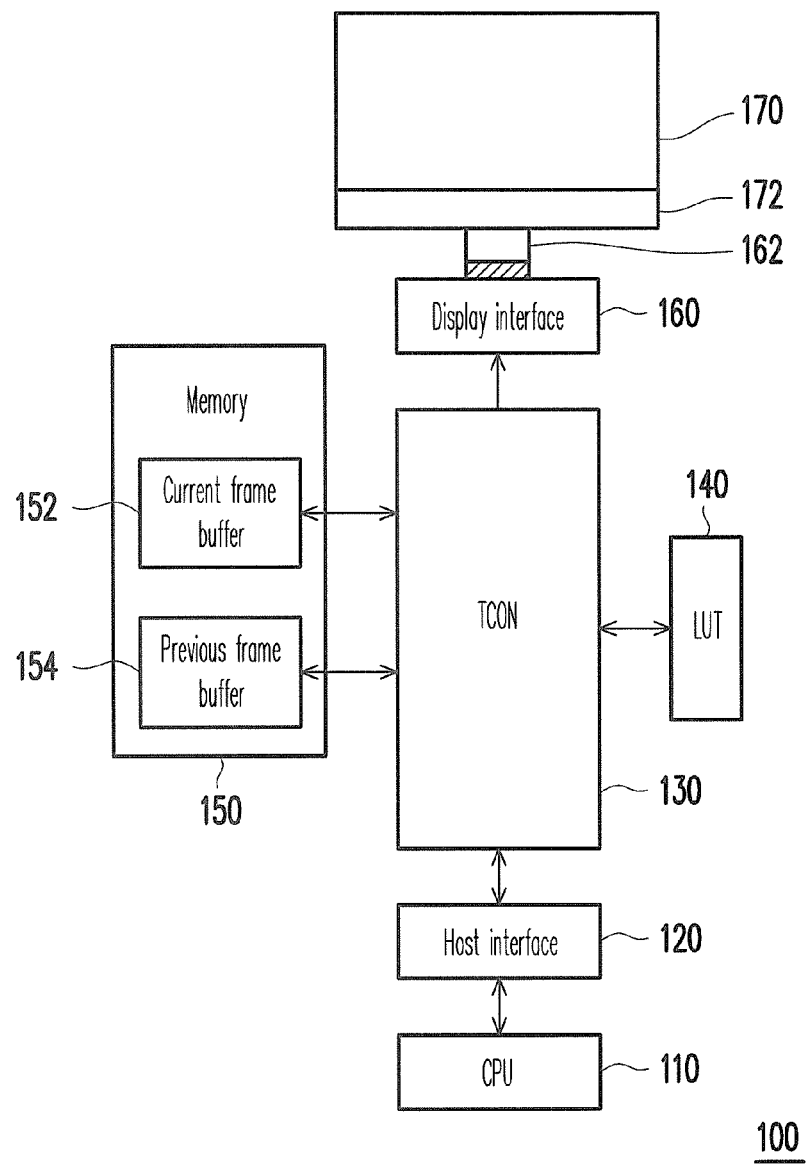
FIG. 1 is a schematic block diagram of a basic architecture of a conventional digital driving circuit.
Figure 2A:
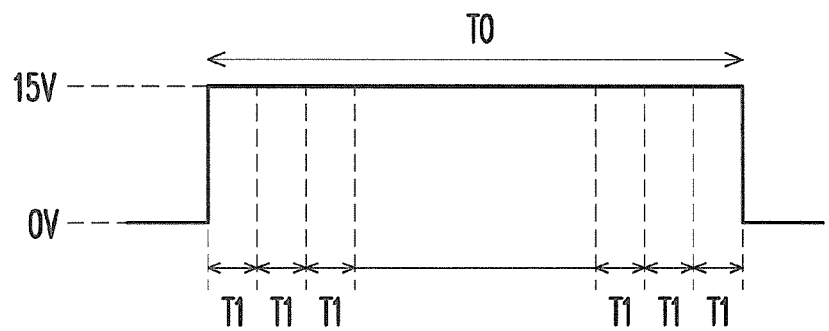
FIGS. 2A and 2B are respectively schematic waveform diagrams of driving voltages corresponding to a black picture and a white picture respectively in a conventional bi-stable display device.
Figure 2B:
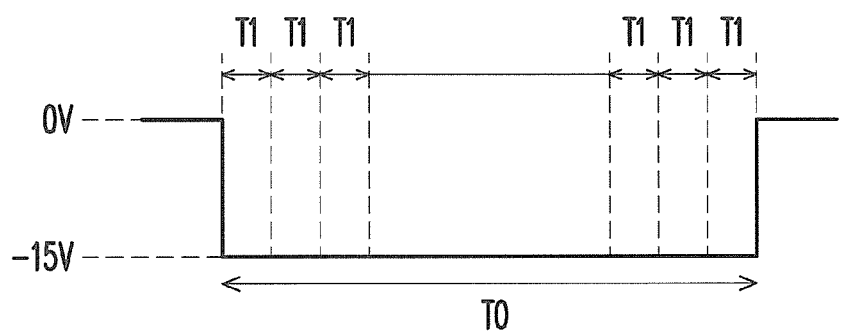

Reference will now be made in detail to the embodiments of the invention, examples of which are illustrated in the accompanying drawings. Wherever possible, the same reference numbers are used in the drawings and the description to refer to the same or like parts.

Figure 5:
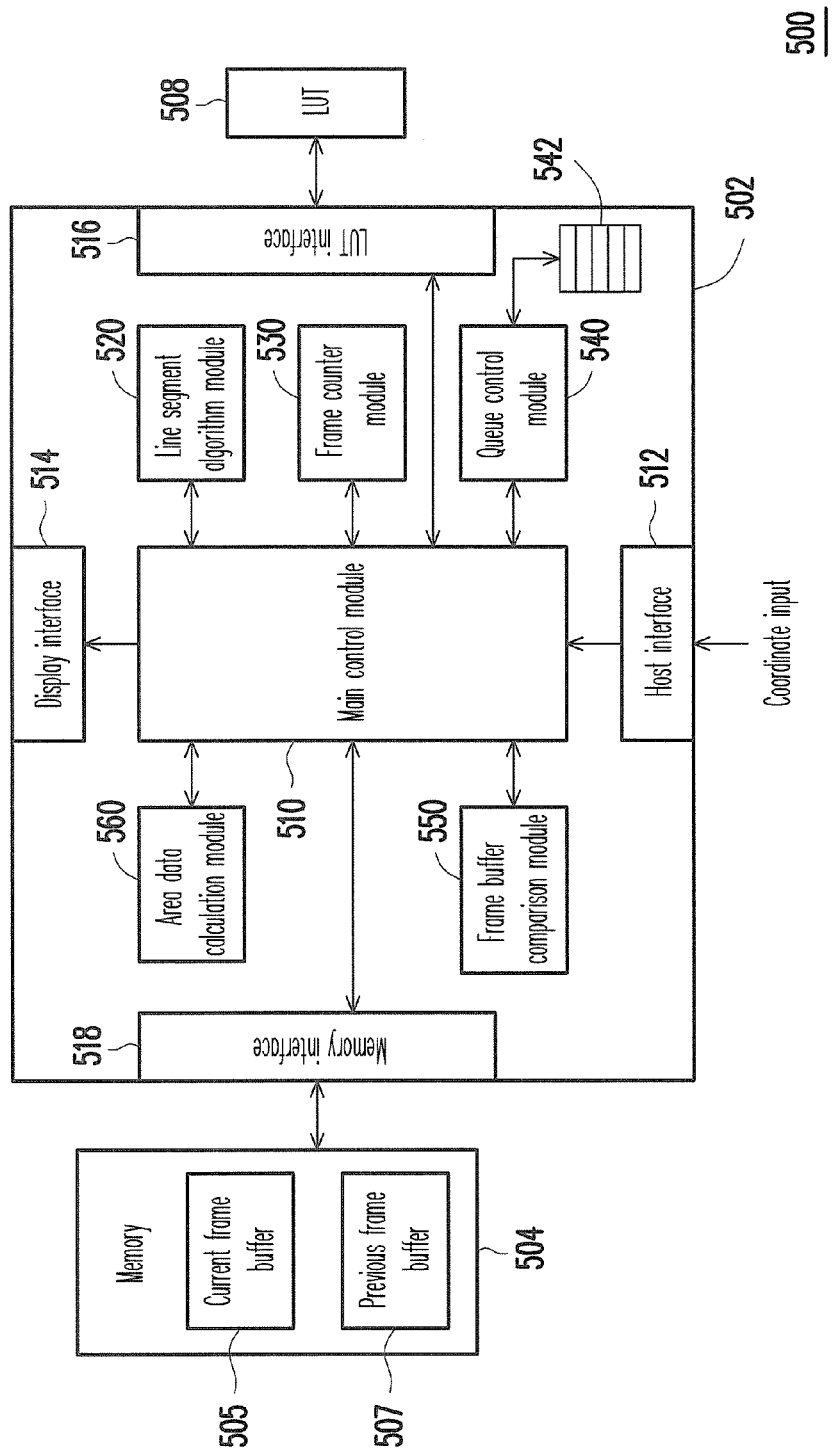
FIG. 5 is a schematic block diagram of a basic architecture of a display control device according to an embodiment.

Referring to FIG. 5, it is a schematic block diagram of a basic architecture of a display control device according to one of embodiments. This display control device 500 may be used in a bi-stable display device to manipulate a bi-stable panel (not shown) to display data. In the display control device 500 of the embodiment, queues for temporary storage and data reconstruction are adopted in a preceding stage of the display process, so that the display speed of drawing or handwriting may be increased.

As shown in FIG. 5, the display control device 500 at least includes a timing controller (TCON) 502, a memory 504, and a look up table (LUT) 508. This TCON 502 is used for controlling all input and output timings, and is connected to a CPU (not shown) through a host interface 512 for receiving image data. Moreover, the TCON 502 is connected to a driving circuit used for driving the bi-stable panel through the display interface 514, and generates driving data according to the received image data, so as to provide the driving data to the driving circuit to drive the panel to update a picture. An image to be displayed for example is one or more line segments input by a user through pen drawing, handwriting or the like, so the image data for example may at least include coordinate data of a starting point and an end point of the respective one or more line segments.

In addition, the TCON 502 is connected to the memory 504 through a memory interface 518. The memory 504 at least includes a current frame buffer 505 and a previous frame buffer 507, which may be different blocks in the same memory, or different separated memories. The current frame buffer 505 is used for temporarily storing display data of an image to be displayed currently, while the previous frame buffer 507 is used for temporarily storing display data of an image that has been completely displayed on the panel.

Moreover, the TCON 502 is connected to the LUT 508 through an LUT interface 516. The LUT 508 is used for recording all possible driving voltage waveforms. In an embodiment, the LUT 508 for example may include all possible combinations of previous display data and current display data, and driving voltage data corresponding to all the possible combinations respectively. In this way, the TCON 502 may obtain driving voltage data of each pixel in the image by referring to the LUT 508 according to previous and current display data stored in the memory 504.

Besides the plurality of connection interfaces, the TCON 502 further includes a main control module 510 connected to a line segment algorithm module 520, a frame counter module 530, a queue control module 540, a frame buffer comparison module 550, and an area data calculation module 560 respectively. The arrangement of these modules is the main difference between the TCON 502 and the conventional TCON 130 in FIG. 1.

The line segment algorithm module 520 is used for reconstructing coordinate data of each point in an entire line segment according to the received coordinate data, such as starting point coordinates and end point coordinates of a line segment. An algorithm adopted by the line segment algorithm module 520 for example may be "A linear algorithm for incremental digital display of circular arcs" proposed by Bresenham, J. E. in Communications of the ACM, Vol. 20, pp. 100-106, 1977, or preferably any computation method capable of acquiring all coordinate data between two points from the coordinates of the two points.

The frame counter module 530 is used for performing individual timing computation on each queue. The queue control module 540 is used for controlling queue access and operation. For example, the queue control module 540 may be coupled to a plurality of registers 542, so as to perform queue access on the plurality of registers. The number of the queues or registers may depend upon design requirements. The frame buffer comparison module 550 is used for comparing pixel data stored in the current frame buffer 505 with that in the previous frame buffer 507 to determine whether a difference exists. The area data calculation module 560 is used for acquiring a width (W) and a length (L) of a rectangular area defined by a starting point and an end point of a line segment according to the received coordinate data (such as coordinate data of the starting point and the end point of the line segment).

With the queues utilized to temporarily store display data, the ICON 502 may perform parallel processing on the display data temporarily stored in the one or more queues, and as a result, display time may be significantly reduced. It will be further illustrated hereinafter that, when an input image includes a plurality of line segments, the TCON 502 may simultaneously perform parallel processing on display data of the different line segments, so as to generate driving data of the plurality of line segments in parallel. Therefore, driving data generated anytime may include driving data of more than one of the plurality of line segments at a time. Additionally, respective complete update time of two consecutive line segments may be overlapping. These features are unlike the prior art in which serial processing is performed on line segments, so only data of a single line segment is processed at any time, with the result that the driving data generated every time is only driving data of the single line segment.

Figure 6:
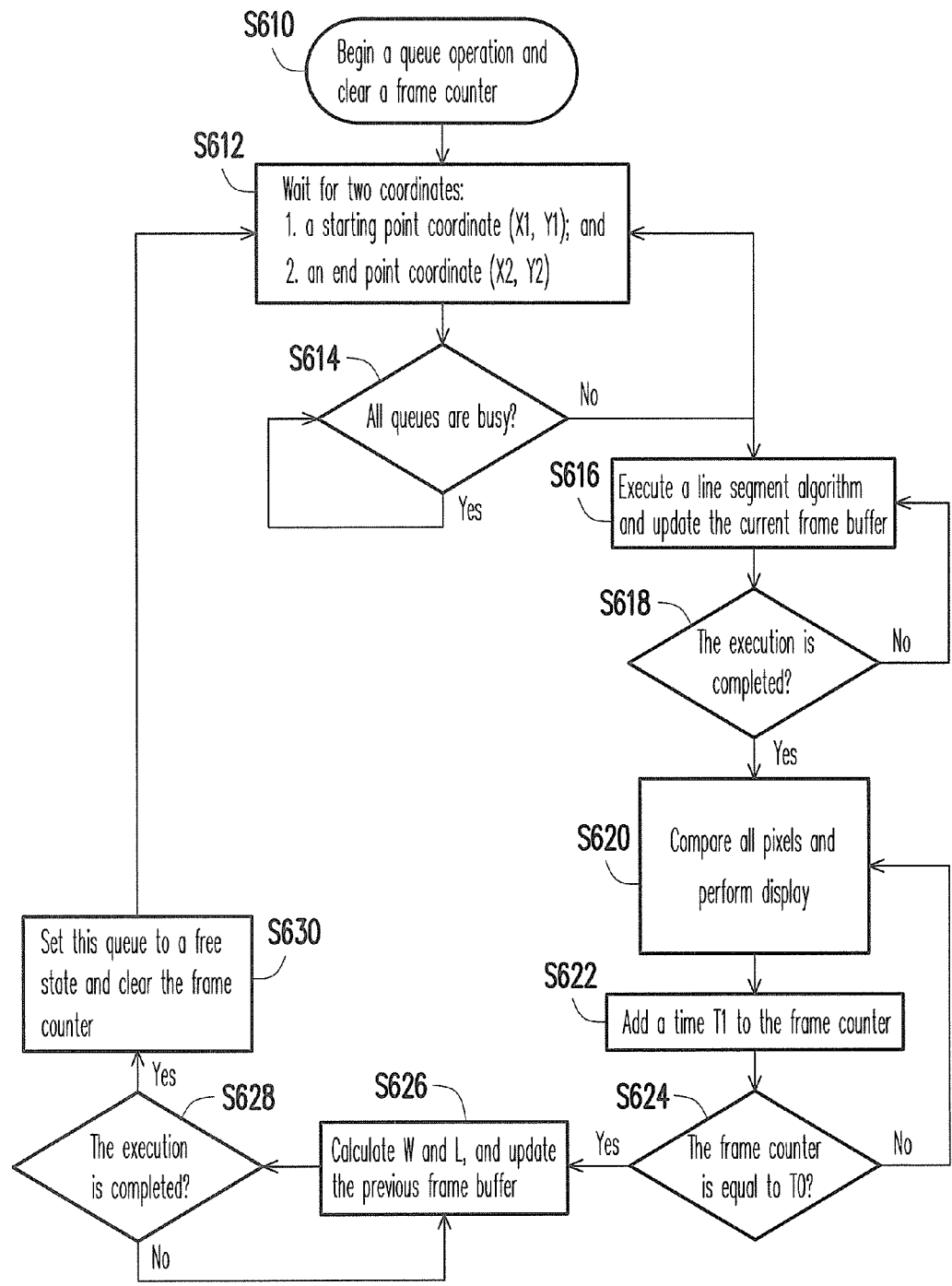
FIG. 6 is a schematic flow chart of an operation method applying the display control device as shown in FIG. 5 according to an embodiment.

FIG. 6 is a schematic flow chart of operation of the display control device 500 as shown in FIG. 5 according to an embodiment. Only operation flows for one line segment and one queue are illustrated in the following illustration, but operation flows for a plurality of line segments and a plurality of queues may be easily deduced, and will not be described herein.

Referring to FIGS. 5 and 6 at the same time, first, the queue control module 540 begins to perform a queue operation, and the frame counter module 530 clears a frame counter (Step S610). Subsequently, if a black line segment is input on a panel by pen drawing, handwriting or the like, the main control module 510 receives first display data of this line segment from the CPU, in which the first display data for example may include coordinate data of part of points of the line segment, which preferably is starting point coordinates and end point coordinates (Step S612).

Next, the queue control module 540 judges whether all queues are busy. If all the queues are busy (Yes), processing of this line segment is rejected, or the judgment is repeated continuously, until a queue is available (Step S614). On the contrary, when a certain queue is available (No), the queue control module 540 stores coordinate data into this available queue.

Next, the line segment algorithm module 520 uses a line segment algorithm to calculate second display data of the line segment according to the received first display data (taking the coordinate data of the starting point coordinates and the end point coordinates of the line segment as an example herein). The second display data preferably is coordinate data of each pixel on the line segment. Then, the main control module 510 may store the second display data calculated by the line segment algorithm module 520 into corresponding addresses of the current frame buffer (Step S616), until the update is completed (Step S618).

The frame buffer comparison module 550 compares display data of all pixels in the current frame buffer 505 to that in the previous frame buffer 507. If the same display data (such as the same pixel value) is stored at corresponding addresses (that is, for the same pixel) of these two buffers, meaning that the pixel is unchanged, the main control module 510 may transfer driving data representing a driving voltage with zero voltage level to the display interface 514. On the contrary, if display data values of corresponding addresses of a certain pixel are not the same, the main control module 510 obtains driving data corresponding to the display data by using the LUT 508, and transfers the driving data to the display interface 514. After one frame execution time T1, human eyes see initial display (in a light color) of this line segment (Step S620).

The frame counter module 530 adds one frame execution time T1 to the timed time of the frame counter (Step S622), and the main control module 510 judges whether the timed time reaches a complete update time T0 (Step S624). The complete update time T0 represents a time T (such as 260 ms) for replacing an entire picture, the frame execution time T1 represents an execution time (such as 20 ms) of each frame, and the complete update time T0 may be integer times of the frame execution time T1. If the timed time is not equal to the complete update time T0 (No), the process flow returns to Step 620, in which comparison of the display data and display are repeated, so as to enhance the color of the line segment.

Until the timed time of the frame counter is equal to the complete update time T0 (Yes), that is, the line segment has been completely displayed on the panel, the area data calculation module 560 may calculate an area surrounding the line segment according to the starting point coordinates and the end point coordinates of the line segment in a free time of display of the line segment. The shape of the area is preferably rectangular (with the width W and the length L). The main control module 510 subsequently may replicate pixel data (referred to as third display data herein) corresponding to all addresses in this rectangular area in the current frame buffer 505 one by one to corresponding addresses of the previous frame buffer 507 through the memory interface 518, so as to update the previous frame buffer 507 (Step S626).

Next, the main control module 510 judges whether the update of the previous frame buffer 507 is completed (Step S628). If the update is not yet completed (No), the replication in Step S626 is continued, until the update is completed. Once the update is completed (Yes), the queue control module 540 makes the queues free, and the frame counter module 530 clears the content of the frame counter (Step S630). Then, the process flow returns to Step S612, in which the main control module 510 waits to receive coordinate data of a next line segment.

It should be noted that, compared with the prior art as shown in FIGS. 1 to 4B-1 and 4B-2 completely using the area image in the display process, in the embodiment as shown in FIGS. 5 and 6, queue temporary storage in combination with data reconstruction is adopted in a preceding stage of the display process, and area image processing is adopted in a succeeding stage of the display process. Specifically, in the prior art as shown in FIGS. 1 to 4B-1 and 4B-2, the current frame buffer 152 is updated with the display data of the area image surrounded by the width (W) and the length (L) in the preceding stage of the display process, and the display data of the area image is replicated from the current frame buffer 152 to the previous frame buffer 154 in the succeeding stage of the display process. However, as far as the embodiment as shown in FIGS. 5 and 6 is concerned, for the update of the current frame buffer 505 in the preceding stage of the display process, the second display data is reconstructed according to the first display data stored in the queue, and the second display data obtained after the reconstruction is stored into the corresponding addresses of the current frame buffer 505. Additionally, for the update of the previous frame buffer 507 in the succeeding stage of the display process, the third display data of the area image surrounded by the width (W) and the length (L) is replicated from the current frame buffer 505 to the previous frame buffer 507.

One of advantages of employing queue temporary storage and data reconstruction in the preceding stage of the display process according to this embodiment lies in that, data processing of different queues may be performed in a pipeline parallel processing manner, so as to reduce the data processing time and improve the display quality. Only the operation flow for one queue is illustrated in the illustration of the embodiment as shown in FIG. 6, but operation details of a plurality of queues may be simply deduced. More operation details about a plurality of line segments (such as n line segments) will be described in the relevant illustration of FIGS. 9 to 11. It is illustrated that, when the technology in FIGS. 5 and 6 is applied, respective complete update time T0 of two consecutive line segments may be overlapping in time, instead of being separated in the prior art. More specifically, a display interval time between two consecutive line segments may be only one frame execution time T1, and hence n line segments can be simultaneously displayed on the panel only after a time of n*T1. Compared with the prior art as shown in FIGS. 1 to 4B-1 and 4B-2 in which area image is processed in the preceding stage of the display process so that the display interval time of two consecutive line segments is one complete update time T0, and hence n line segments are simultaneously displayed after a longer time of n*T0, the display speed and quality may be greatly improved in the pipeline parallel process.

It should be noted that, in the embodiment as shown in FIGS. 5 and 6, the operating principle of queue temporary storage and data reconstruction (for updating the current frame buffer 505 in the preceding stage of the display process) combined with the area image (for updating the previous frame buffer 507 in the succeeding stage of the display process) is adopted. However, in other embodiments, the previous frame buffer 507 may be updated in other different manners. For example, queue temporary storage and data reconstruction may be adopted completely with area image processing excluded, so as to further improve the display speed and quality.

Figure 7:
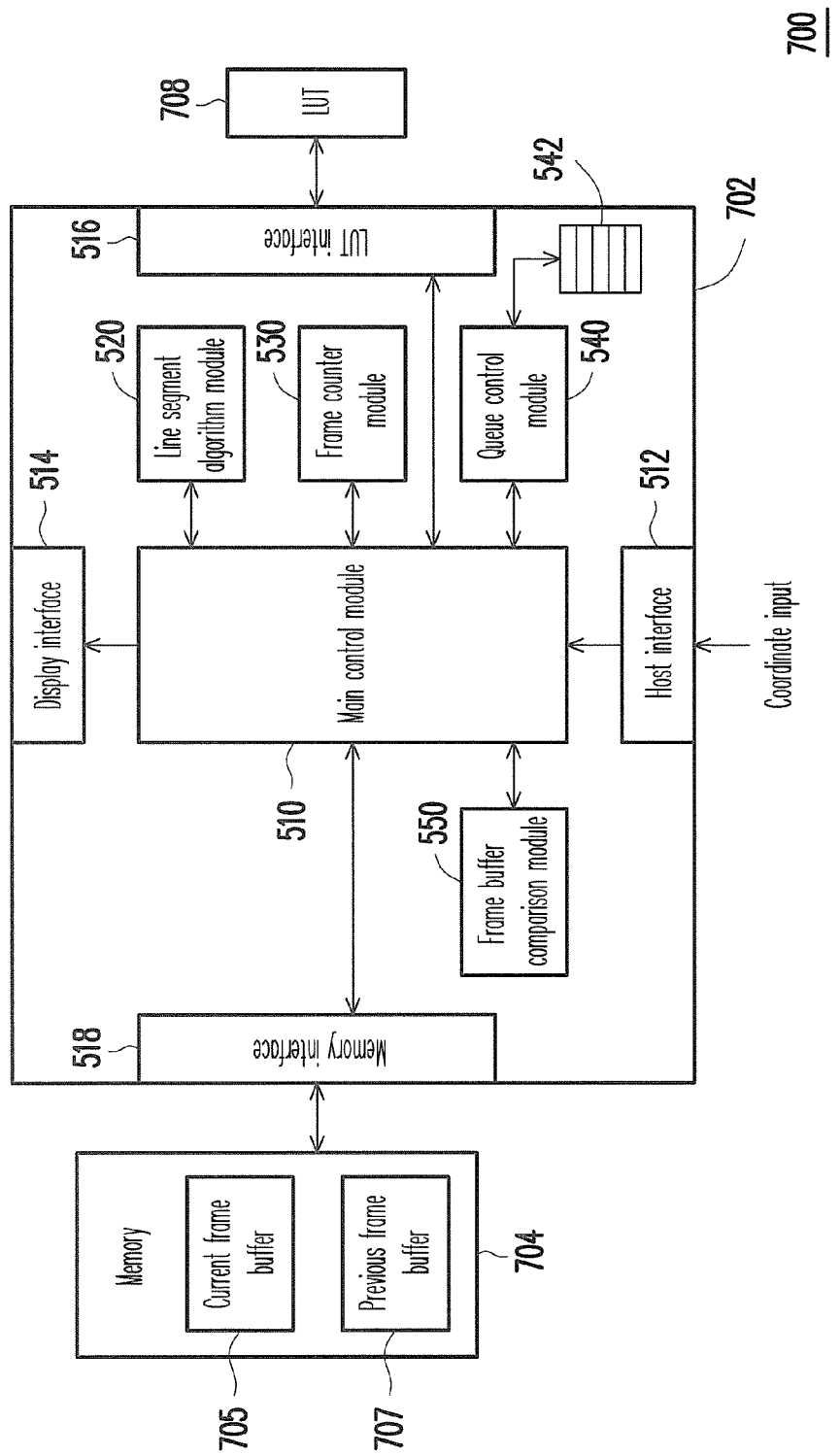
FIG. 7 is a schematic block diagram of a basic architecture of a display control device according to another embodiment.

Referring to FIG. 7, it is a schematic block diagram of a basic architecture of a display control device according to an embodiment which completely employs queue temporary storage and data reconstruction. The display control device 700 may be applied to a bi-stable display device. In the embodiment, the replication method is not used to update a previous frame buffer; instead, as in the preceding stage of the display process, all pixels on a line segment are re-drawn by using coordinate data temporarily stored in the queues, and then are stored into the previous frame buffer.

Similar to the display control device 500 in FIG. 5, the display control device 700 in FIG. 7 likewise at least includes a TCON 702, a memory 704, and an LUT 708. This memory 704 also at least includes a current frame buffer 705 and a previous frame buffer 707. The elements having the same functions as those in FIG. 5 are given the same reference symbols, and details thereof will not be described again. In comparison of FIG. 7 with FIG. 5, the main difference between them lies in that the area data calculation module 560 is removed from the display control device 700 in FIG. 7.

Referring to FIG. 6, it is a schematic flow chart of operation of the display control device 500 as shown in FIG. 5 according to an embodiment. It should be noted that, only the operation for one line segment and one queue is illustrated in the following illustration, but the operation for a plurality of line segments and a plurality of queues may be easily deduced, and will not be described herein.

Figure 8:
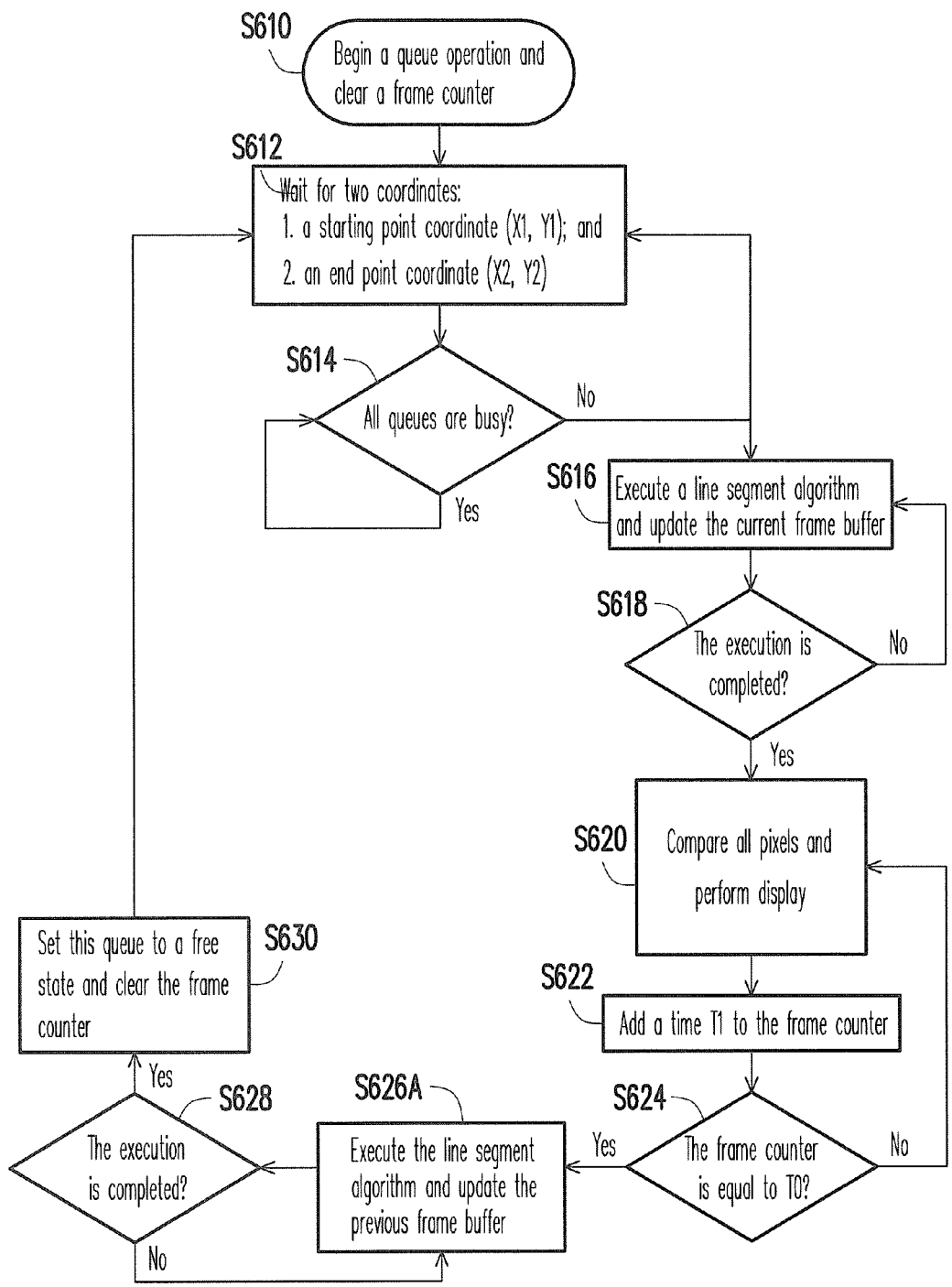
FIG. 8 is a schematic flow chart of an operation method applying the display control device as shown in FIG. 7 according to an embodiment.

The flow chart as shown in FIG. 8 is similar to that in FIG. 6, so the same steps are given the same reference symbols, and details thereof will not be described herein again. The difference between the process flows as shown in FIGS. 8 and 6 is that Step S626 is replaced with Step S626A, in which the previous frame buffer 707 is updated in a different manner. In this embodiment, second display data and third display data are the same, and may be even obtained in the same manner.

Specifically, in Step S626A in FIG. 8, the line segment algorithm module 520 again utilizes first display data of a line segment to reconstruct the third display data. Likewise, more preferably, the first display data is coordinate data of part of the line segment, such as starting point coordinates (X1, Y1) and end point coordinates (X2, Y2) of the line segment. The line segment algorithm module 520 may then use a line segment algorithm to draw all pixels of the line segment. The display data (that is, the third display data) of these pixels can then be stored into corresponding addresses of the previous frame buffer 707. In other words, the data amount required to be updated is only the data amount of the line segment itself. Compared with the prior art or Step S626 in FIG. 6 in which all display data in an area surrounding the line segment is replicated from the current frame buffer 505 to the previous frame buffer 507 so that the data amount of all pixels in the area (W×L) needs to be updated, the updated data amount of the embodiment in FIG. 8 is greatly reduced, so access time may be greatly saved.

It should be noted that, because the current frame buffer 705 is updated in a manner of queue temporary storage and data reconstruction in a preceding stage of the display process, pipeline parallel processing may be adopted in in FIGS. 7 and 8 likewise to increase display speed. In addition, compared with the embodiment in FIGS. 5 and 6, the previous frame buffer 707 is updated by using queue temporary storage and data reconstruction in a succeeding stage of the display process in the embodiment of FIGS. 7 and 8, so the display speed can be further increased, and errors caused by overlapping image blocks of a plurality of line segments can also be avoided. More operation details about FIGS. 7 and 8 will be described in the relevant illustration of FIGS. 12A to 12C.

Processing and Display Processes of Non-Overlapping Consecutive Line Segments

Figure 4A:
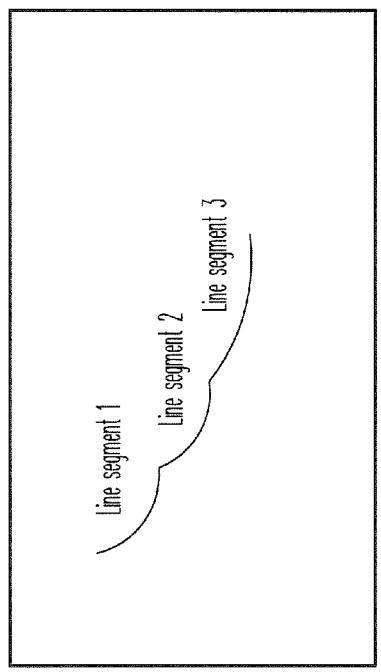
FIG. 4A is a schematic view of three consecutively input line segments.
Figures 1, 4B:
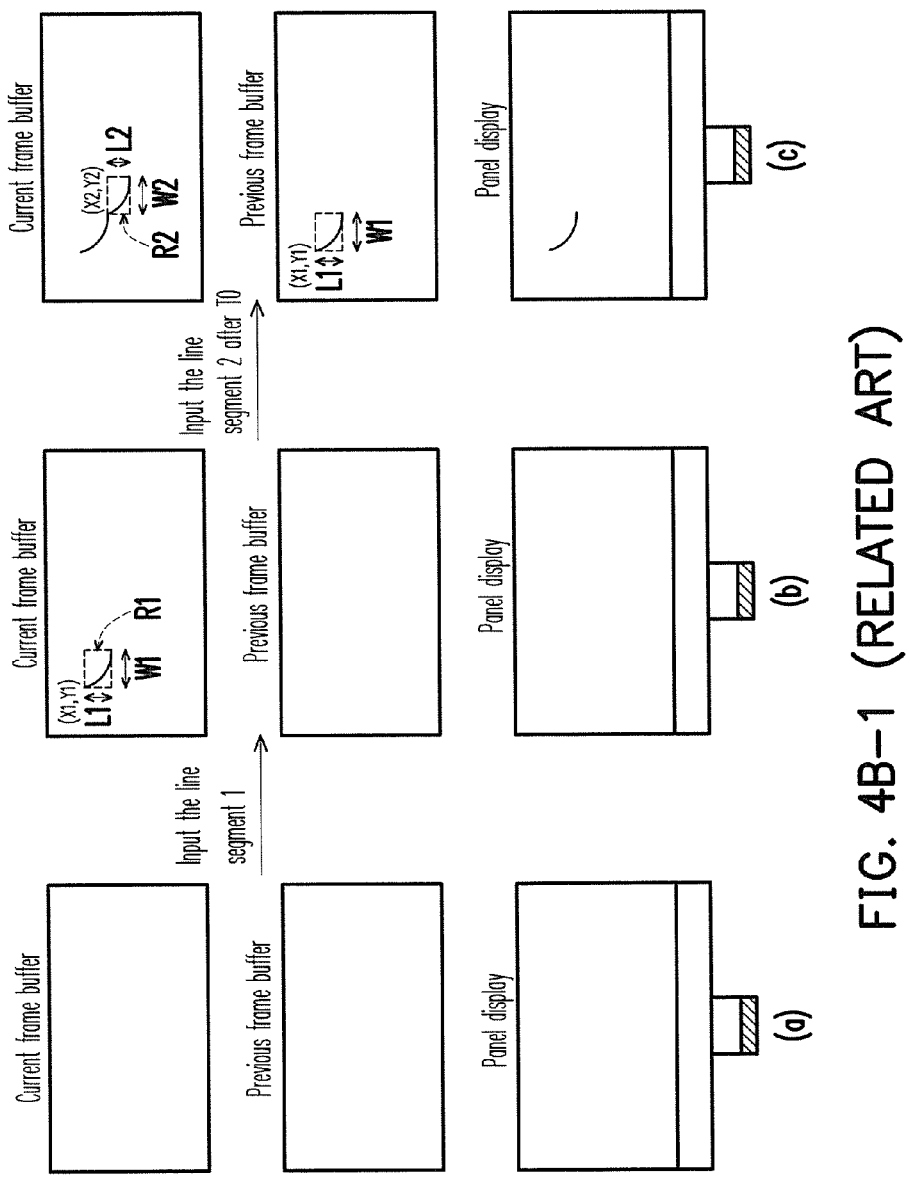

In the following illustration, operating principles of the elements when the display control device 500 in FIG. 5 applies the process flow as shown in FIG. 6 are illustrated in detail by taking a user drawing three consecutive line segments with a pen as an example. These three line segments are for example the first line segment, the second line segment, and the third line segment as shown in FIG. 4A, which are non-overlapping.

Figure 9A:
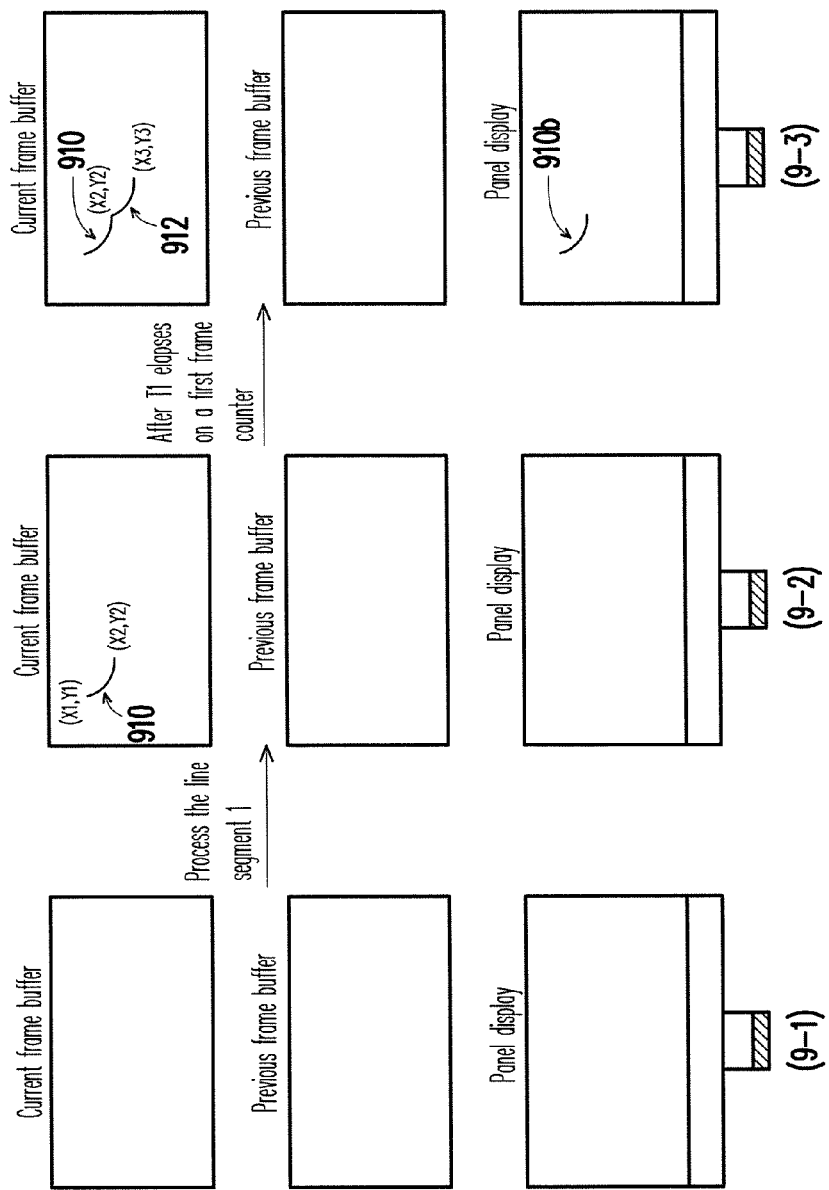
FIGS. 9A to 9C are schematic views of examples of storage data of a current frame buffer and a previous frame buffer and display data of a panel corresponding to the operation architecture in FIGS. 5 and 6 and the input line segments as shown in FIG. 4A according to an embodiment.
Figure 9B:
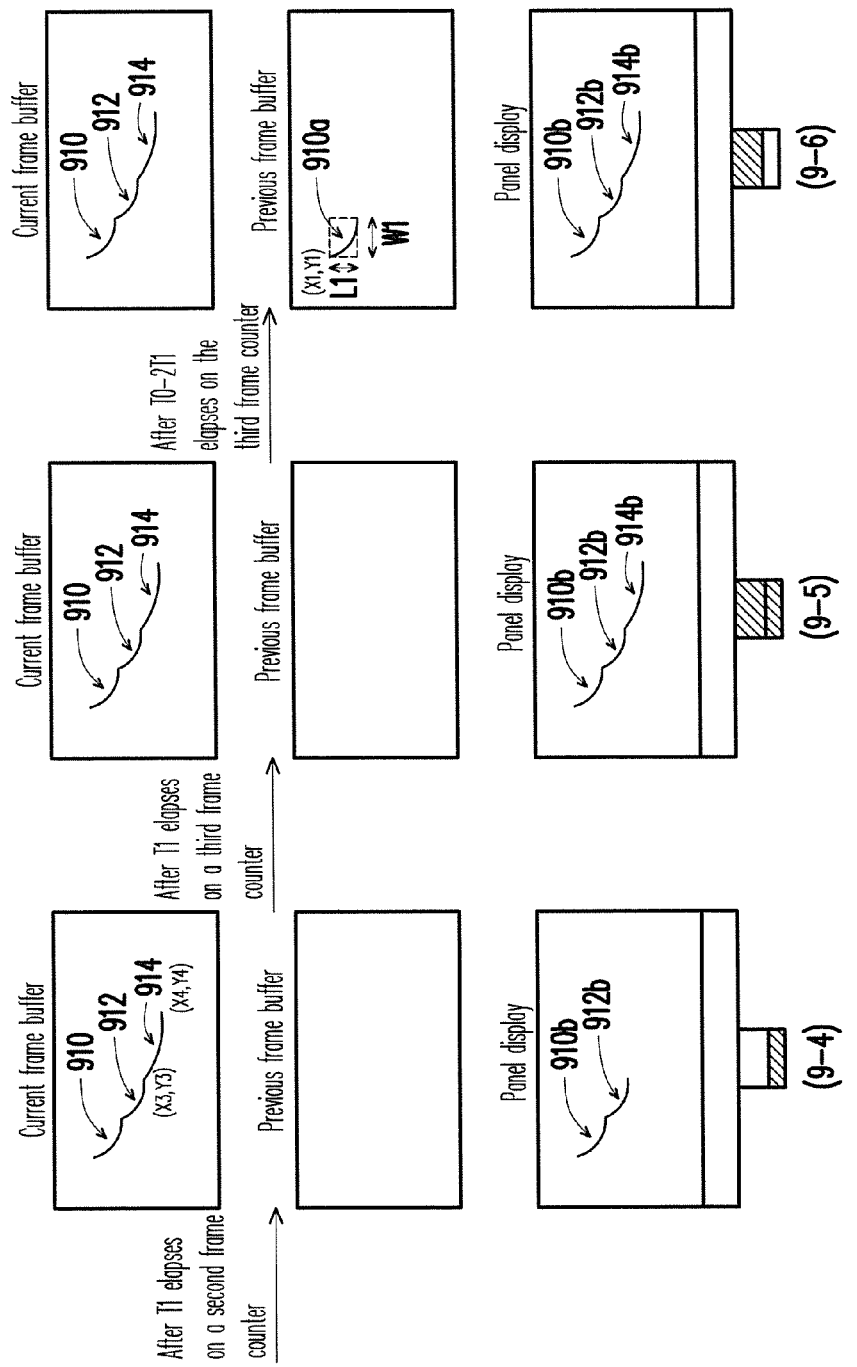
Figure 9C:
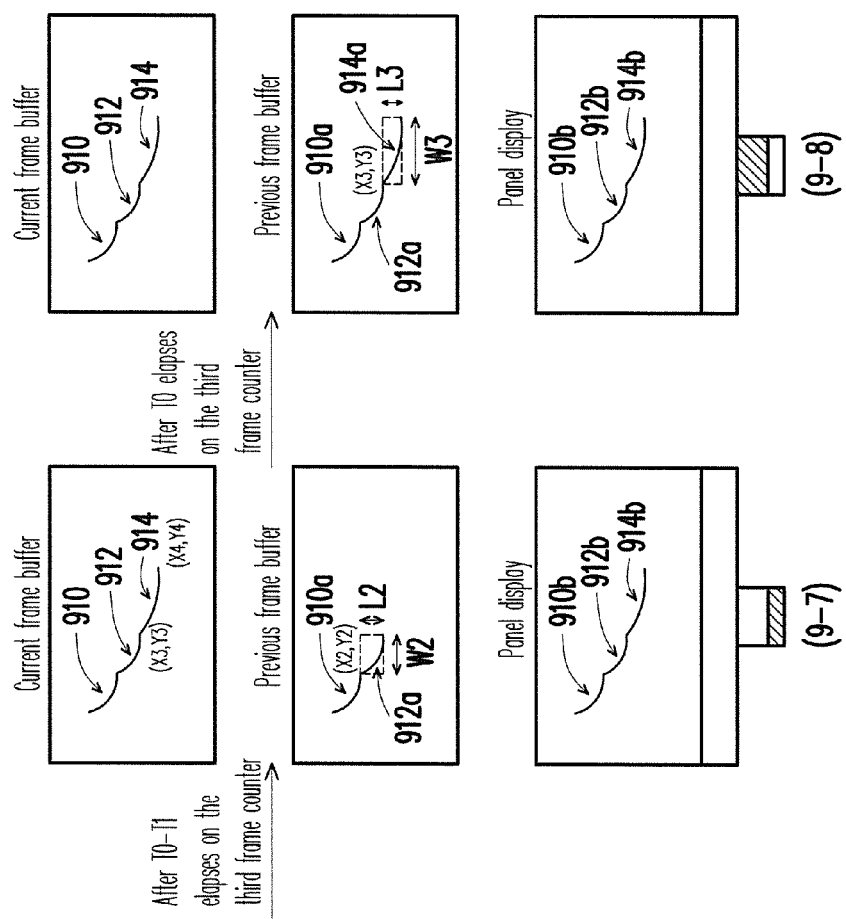

Referring to FIGS. 9A to 9C, they include FIGS. 9-1 to 9-8 for illustrating contents stored in the current frame buffer 505 and the previous frame buffer 507 respectively, and contents displayed on the panel in different stages according to an embodiment. FIGS. 9-1 to 9-5 show an operation procedure with a queue architecture in the preceding stage of the display process, while FIGS. 9-6 to 9-8 show an operation procedure with an area image in the succeeding stage of the display process.

First, it is assumed that both the current frame buffer and the previous frame buffer are blank at the beginning, as shown in FIG. 9-1. The CPU transfers coordinate data of one line segment once, so coordinate data of three line segments needs to be consecutively transferred three times. After receiving coordinate data of a first line segment 910, the queue control module 540 stores starting point coordinates (X1, Y1) and end point coordinates (X2, Y2) of the first line segment into a first queue; after receiving coordinate data of a second line segment 912, the queue control module 540 stores starting point coordinates (X2, Y2) and end point coordinates (X3, Y3) of the second line segment 912 into a second queue; and after receiving coordinate data of a third line segment 914, the queue control module 540 stores starting point coordinates (X3, Y3) and end point coordinates (X4, Y4) of the third line segment 914 into a third queue.

Figures 2, 4B:
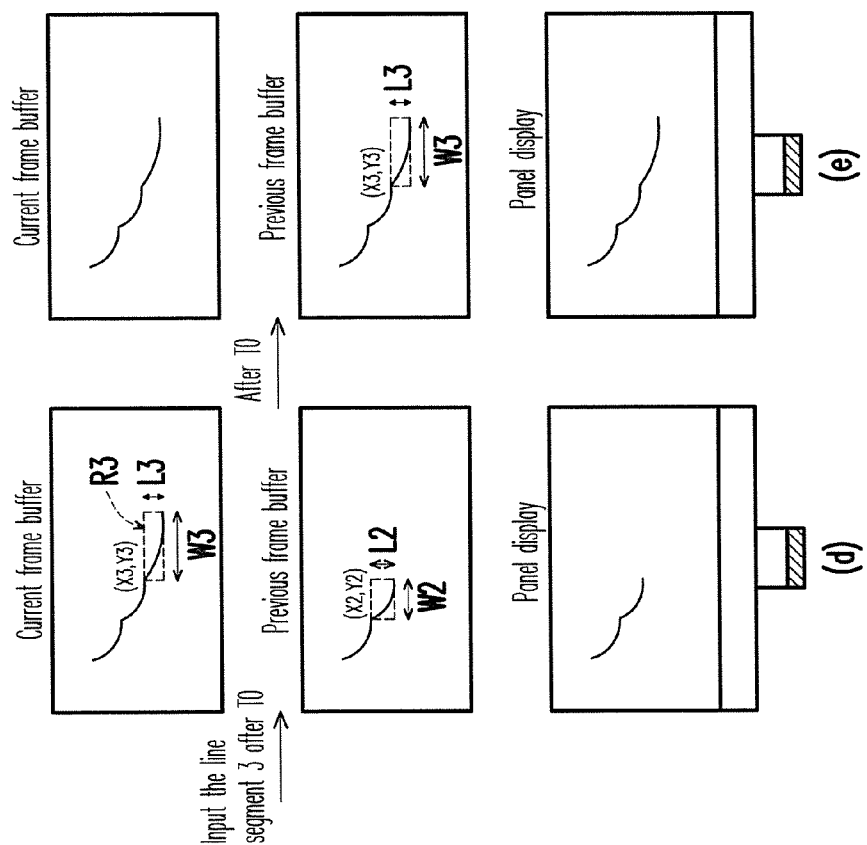

Next, the line segment algorithm module 520 uses a line segment algorithm to re-draw all pixels of the first line segment 910 according to the coordinate data stored in the first queue. Then, the main control module 510 stores display data of all the pixels of the first line segment 910 into the current frame buffer 505 one by one. In this way, the display data of the first line segment 910 is stored in the current frame buffer 505, as shown in FIG. 9-2.

Figure 3A:
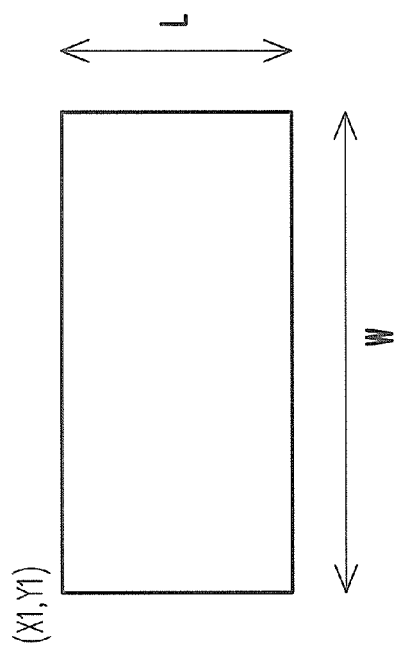
FIG. 3A is a schematic view of an example of a black rectangular frame.
Figure 3B:
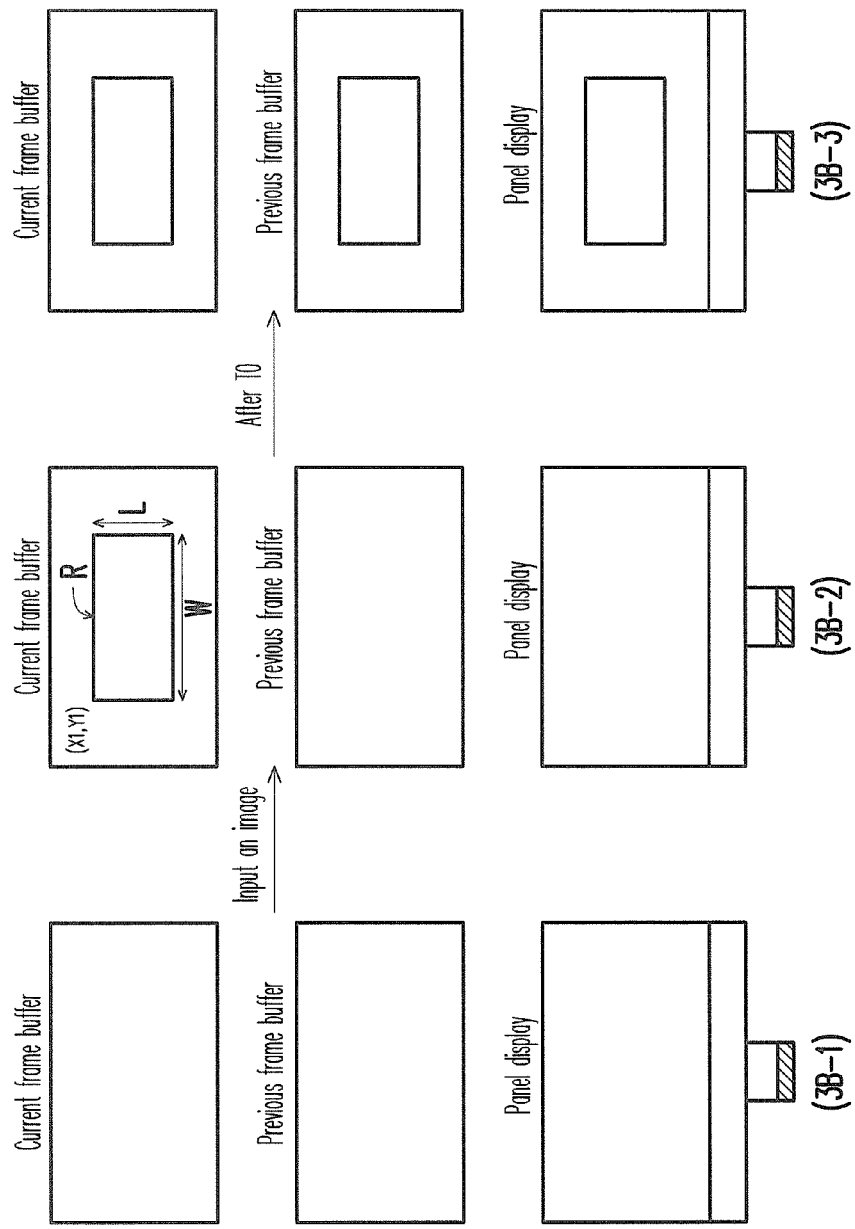
FIG. 3B is schematic views of examples of storage content of a current frame buffer and a previous frame buffer and display content of a panel corresponding to FIG. 3A.

Next, the frame buffer comparison module 550 begins to compare all image pixels in the current frame buffer 505 with those the previous frame buffer 507, and then transfers driving data corresponding to a driving voltage of 0 V to the display interface 514 when a comparison result indicates that they are the same. Alternatively, the main control module 510 obtains driving data by referring to the LUT 508 and transfers the driving data to the display interface when the comparison result indicates that they are not the same. Subsequently, the frame counter module 530 adds one frame execution time T1 to a frame counter to which the first queue belongs. Therefore, after a timed time of T1 elapses on a first frame counter, human eyes can see initial display (in a light color) of a first line segment 910b on the panel, as shown in FIG. 9-3.

Next, similarly, the line segment algorithm module 520 uses the line segment algorithm to re-draw all pixels of the second line segment 912 according to the coordinate data stored in the second queue. Furthermore, the main control module 510 stores display data of these pixels into the current frame buffer 505. In this way, the display data of the first line segment 910 and the second line segment 912 is stored in the current frame buffer 505, as shown in FIG. 9-3 likewise.

Next, the frame buffer comparison module 550 compares all image pixels in the current frame buffer 505 with those in the previous frame buffer 507, and the main control module 510 may provide driving data to the display interface. Subsequently, the frame counter module 530 further respectively adds one frame execution time T1 to frame counters to which the first queue and the second queue respectively belong. Therefore, after a timed time of 2T1 elapses on the first frame counter, that is, after a timed time of T1 elapses on a second frame counter, human eyes see the first line segment 910b with a slightly enhanced color and an initially displayed second line segment 912b on the panel, as shown in FIG. 9-4.

Next, similarly, the line segment algorithm module 520 uses the line segment algorithm to draw all pixels of the third line segment 914 according to the coordinate data stored in the third queue. Furthermore, the main control module 510 stores display data of these pixels into the current frame buffer 505. In this way, the display data of the first line segment 910, the second line segment 912, and the third line segment 914 is stored in the current frame buffer 505, as shown in FIG. 9-4 likewise.

Next, the frame buffer comparison module 550 compares all image pixels in the current frame buffer 505 with those in the previous frame buffer 507, and the main control module 510 may provide driving data to the display interface. Subsequently, the frame counter module 530 further respectively adds one frame execution time T1 to frame counters to which the first queue to the third queue respectively belong. Therefore, after a timed time of 3T1 elapses on the first frame counter, that is, a timed time of 2T1 elapses on the second frame counter, that is, a timed time of T1 elapses on a third frame counter, human eyes can see the first line segment 910b with a further strengthened color, the second line segment 912b with a slightly strengthened color, and an initially displayed third line segment 914b on the panel, as shown in FIG. 9-5.

Next, the pixel comparison step of the current frame buffer 505 and the previous frame buffer 507 and the display step are repeated, so as to gradually strengthen the color of each of the line segments, until the first frame counter is equal to the complete update time T0 (that is, the second frame counter and the third frame counter are equal to time of T0-T1 and T0-2T1 respectively), and a first line segment 910b has been completely displayed on the panel. At this time, the line segment algorithm module 520 utilizes the starting point coordinates and the end point coordinates of the first line segment 910 to calculate a rectangular area (with a length of L1 and a width of W1) surrounding the first line segment 910. The main control module 510 subsequently replicates display data of all pixels in this rectangular area from the current frame buffer 505 to corresponding addresses of the previous frame buffer 507, so as to update the previous frame buffer 507. In this way, the display data of the first line segment 910a is stored in the previous frame buffer 507, as shown in FIG. 9-6. Moreover, the queue control module 540 makes the first queue free, and the frame counter module 530 clears the first frame counter.

Similarly, after another frame execution time T1 elapses, that is, when the second frame counter is equal to the complete update time T0, the second line segment 912b is also completely displayed on the panel. Therefore, the line segment algorithm module 520 likewise calculates a rectangular area (with a length of L2 and a width of W2) surrounding the second line segment 912, and the main control module 510 replicates display data of all pixels in this rectangular area from the current frame buffer 505 to corresponding addresses of the previous frame buffer 507, so as to update the previous frame buffer 507. In this way, the display data of the first line segment 910a and the second line segment 912a is stored in the previous frame buffer 507, as shown in FIG. 9-7. The queue control module 540 makes the second queue free, and the frame counter module 530 clears the second frame counter.

Similarly, after another frame execution time T1 elapses, that is, when the third frame counter is equal to the complete update time T0, the third line segment 914b is also completely displayed on the panel. Therefore, the line segment algorithm module 520 likewise calculates a rectangular area (with a length of L3 and a width of W3) surrounding the third line segment 914, and the main control module 510 replicates display data of all pixels in this rectangular area from the current frame buffer 505 to corresponding addresses of the previous frame buffer 507, so as to update the previous frame buffer 507. In this way, the display data of the first line segment 910a, the second line segment 912a, and the third line segment 914a is stored in the previous frame buffer 507, as shown in FIG. 9-8. Moreover, the queue control module 540 makes the third queue free, and the frame counter module 530 clears the third frame counter.

In view of the above, after one frame execution time T1, driving data generated by the main control module 510 includes data of the first line segment, so the first line segment 910a may be initially displayed on the panel. After another frame execution time T1, driving data generated by the main control module 510 includes data of the first line segment and the second line segment, so the display of the first line segment 910a may be enhanced (such as with a darkened color) on the panel, and the second line segment 912a may be initially displayed on the panel. After another frame execution time T1, driving data generated by the main control module 510 includes data of the first line segment to the third line segment, so the display of the first line segment 910a and the second line segment 912a may be enhanced (such as with a darkened color) on the panel, and the third line segment 914a may be initially displayed on the panel.

Compared with the prior art in FIGS. 1 to 4B-1 and 4B-2 in which the driving data generated anytime only includes driving data for displaying a single line segment, in this embodiment employing pipeline parallel processing, coordinate data of different queues can be simultaneously processed, so respective complete update times of two consecutive line segments are overlapping, and the driving data generated anytime may include driving data for displaying a plurality of line segments. Moreover, compared with the prior art in which an interval time between two consecutive line segments initially displayed is up to one complete update time T0, in this embodiment, the interval time may be reduced to one frame execution time T1. As a result, in this embodiment, data processing time may be greatly reduced, thereby effectively improving the display speed and the display quality.

It should be noted that, although the illustration is made with reference to the architecture as shown in FIG. 5 and the process flow as shown in FIG. 6 in this embodiment, the architecture in FIG. 7 and the process flow in FIG. 8 may be easily deduced. The difference is mainly that the previous frame buffer 707 is no longer updated in the manner as shown in FIGS. 9-6 to 9-8. When the architecture in FIG. 7 and the process flow in FIG. 8 are applied, the line segment algorithm module 520 again uses the line segment algorithm to reconstruct all pixels of the first line segment 910 to the third line segment 914, and then the main control module 510 further utilizes the reconstructed data to update the previous frame buffer 707. The detailed process flow of each stage will not be described herein again. With the architecture in FIG. 7 and the process flow in FIG. 8, not only the display speed in the preceding stage of the display process can be increased due to pipeline processing as in FIGS. 6 and 7, but also the required data amount and consumed time for updating the previous frame buffer 707 in the succeeding stage of the display process can be reduced, thereby further increasing the display speed.

Processing and Display Processes of Overlapping Consecutive Line Segments

In another case that blocks of a plurality of line segments are overlapping with each other, compared with the embodiment in FIGS. 5 and 6, the embodiment in FIGS. 7 *and* 8 may further avoid errors caused by the pipeline parallel processing. Hereinafter, detailed explanation will be made for the case that line segments are overlapping with reference to FIGS. 10 to 12.

Figure 10:
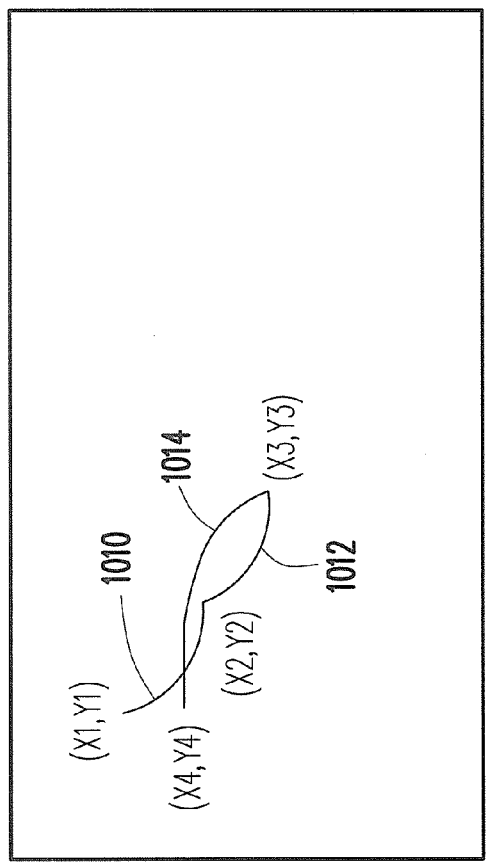
FIG. 10 is a schematic view of an example of input overlapping line segments.

In the following illustration, operating principles of the elements when the display control device 500 in FIG. 5 applies the process flow as shown in FIG. 6, and the display control device 700 in FIG. 7 applies the process flow as shown in FIG. 8 respectively are described in detail by taking a user drawing three consecutive line segments with a pen as an example. These three line segments are for example a first the line segment 1010, a second the line segment 1012, and a third the line segment 1014 as shown in FIG. 10, in which the first line segment 1010 and the third line segment 1014 are overlapping.

Figure 11A:
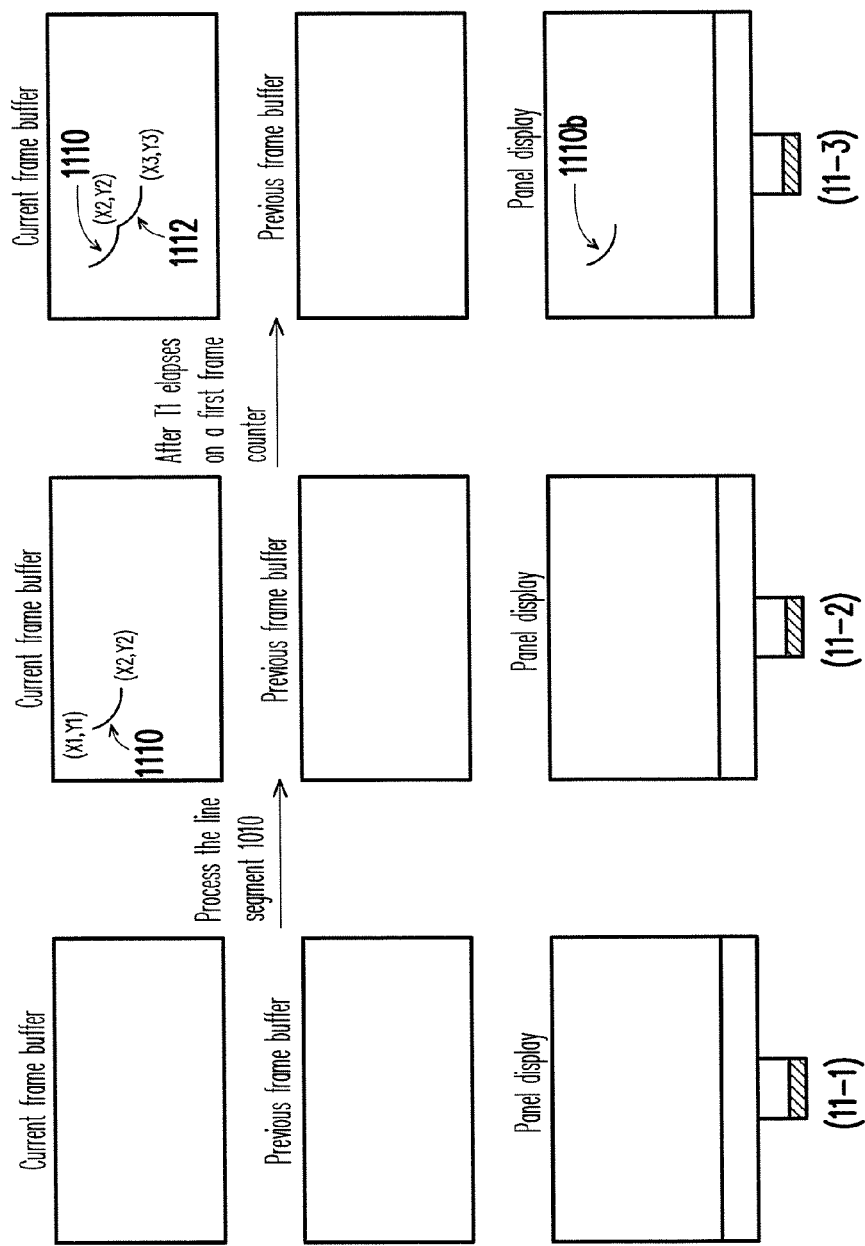
FIGS. 11A to 11B are schematic views of examples of storage data of a current frame buffer and a previous frame buffer and display data of a panel corresponding to the operation architecture in FIGS. 5 and 6 and the input line segments as shown in FIG. 10 according to an embodiment.
Figure 11B:
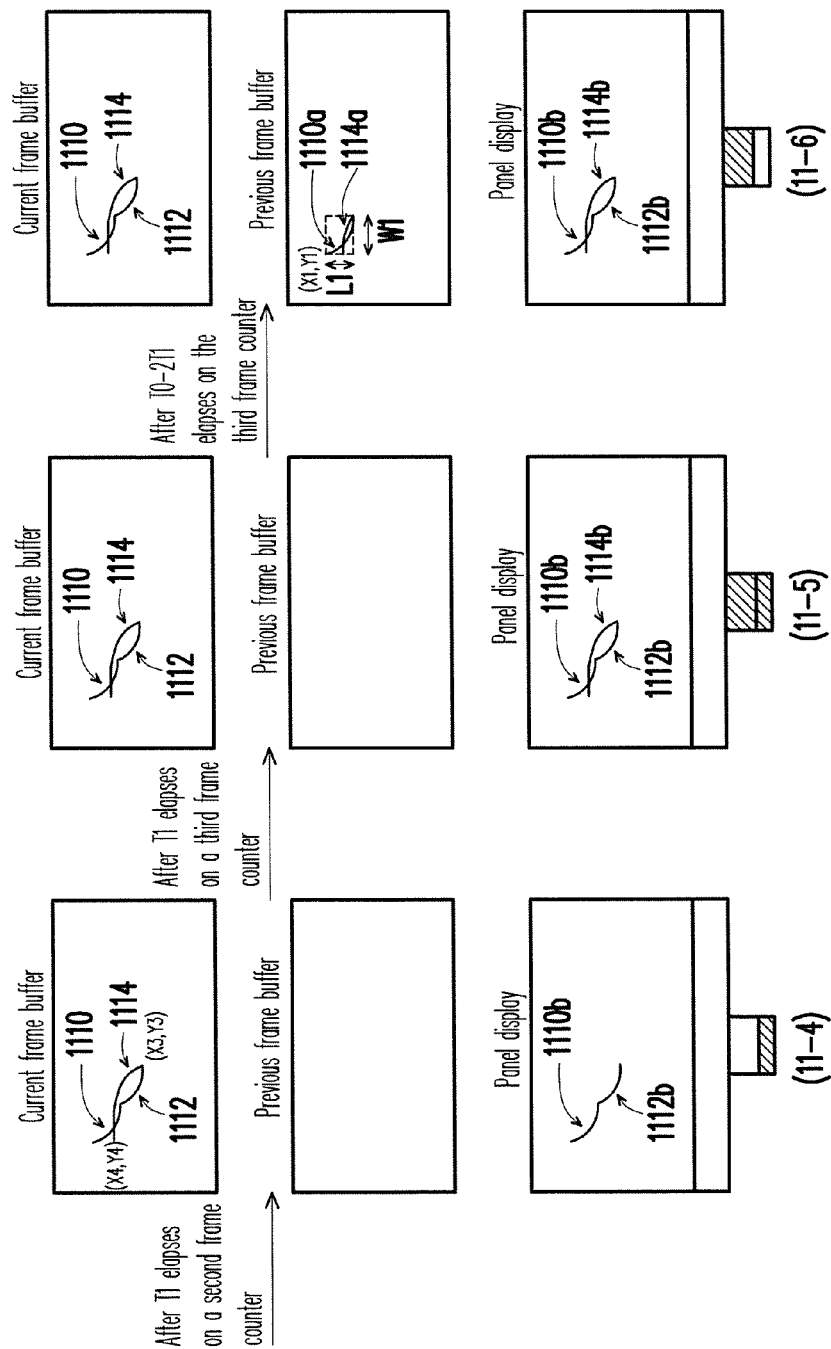

First, referring to FIGS. 11A to 11B, they include FIGS. 11-1 to 11-6 for illustrating the contents stored in the current frame buffer 505 and the previous frame buffer 507 respectively, and the contents displayed on the panel in different stages in the case that the display control device 500 in FIG. 5 applies the process flow as shown in FIG. 6 according to an embodiment.

The illustration of FIGS. 11-1 to 11-5 relevant to the preceding stage of the display process is similar to the illustration of FIGS. 9-1 to 9-5 respectively, and will not be repeated herein again for brevity. However, the difference mainly occurs in the succeeding stage of the display process. In the succeeding stage of the display process in this embodiment, when an area image including the first line segment 110a is utilized to update the previous frame buffer 507, the previous frame buffer 507 updates the display data of the third line segment 114 ahead of time, thereby resulting in that the third line segment 114 cannot be completely displayed on the panel (that is, in a slightly light color).

Specifically, referring to FIG. 11-6, when a complete update time T0 elapses on the first frame counter and a first line segment 1110b has been completely displayed (meanwhile, the second frame counter and the third frame counter only reaches T0-T1 and T0-2T1 respectively, and the second line segment and the third line segment are not yet completely displayed), the area data calculation module 560 utilizes starting point coordinates (X1, Y1) and end point coordinates (X2, Y2) of a first line segment 1110 to calculate a rectangular area (with a width of W1 and a length of L1) surrounding a first line segment 1110a. Then, the main control module 510 replicates display data of all pixels in this rectangular area from the current frame buffer 505 to a corresponding address of the previous frame buffer 507, so as to update the previous frame buffer 507. Because display data of a third line segment 1014a has already been stored in the current frame buffer 505 at this time, the data replicated to the previous frame buffer 507 additionally includes display data of a partial line segment of the third line segment 1014a falling in this rectangular area.

Next, comparison and displaying process for the second line segment and comparison and displaying process for the third line segment still must be performed once and twice respectively, and the processes are similar to that in the relevant illustration in FIGS. 9-7 and 9-8, and will not be described herein for brevity. However, since a partial line segment 1114a of the third line segment 1014 is simultaneously stored in the current frame buffer 505 and the previous frame buffer 507, when the frame buffer comparison module 550 compares all image pixels in the current frame buffer 505 and the previous frame buffer 507, the pixel difference of the partial line segment of the third line segment 1014 cannot be obtained by comparison. As a result, the color of the partial line segment of the third line segment cannot be further enhanced, causing the third line segment to be incompletely displayed.

Figure 12A:
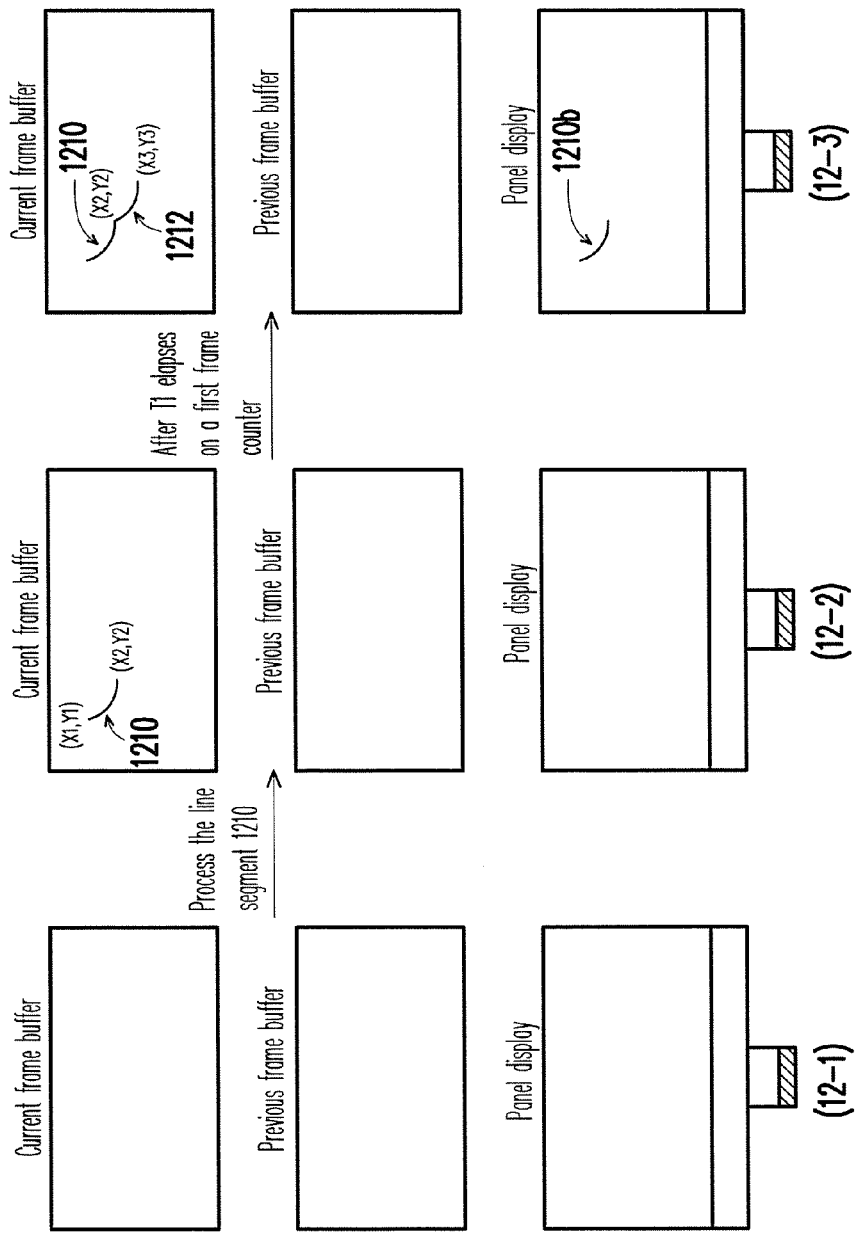
FIGS. 12A to 12C are schematic views of examples of storage data of a current frame buffer and a previous frame buffer and display data of a panel corresponding to the operation architecture in FIGS. 7 and 8 and the input line segments as shown in FIG. 10 according to an embodiment.
Figure 12B:
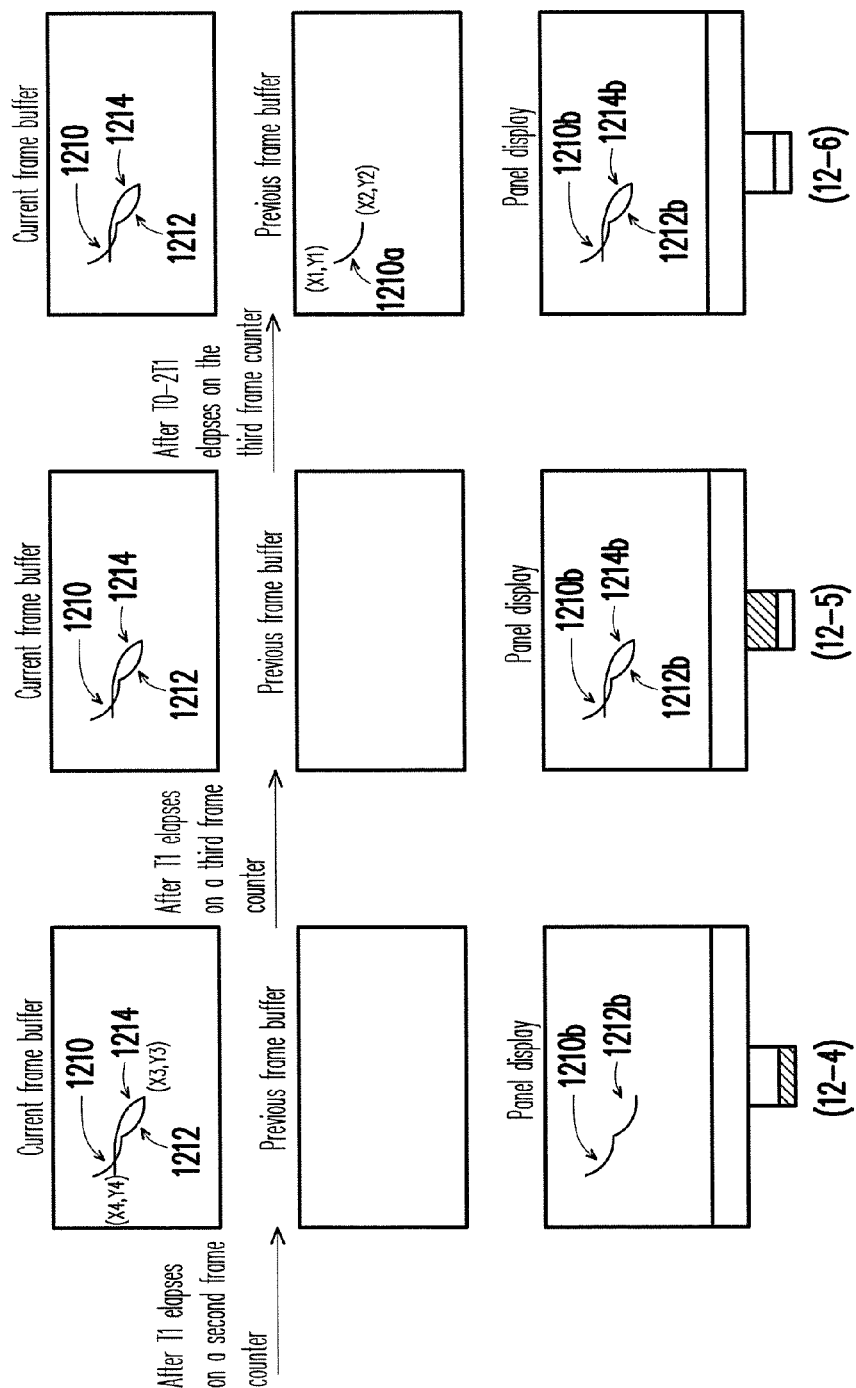
Figure 12C:
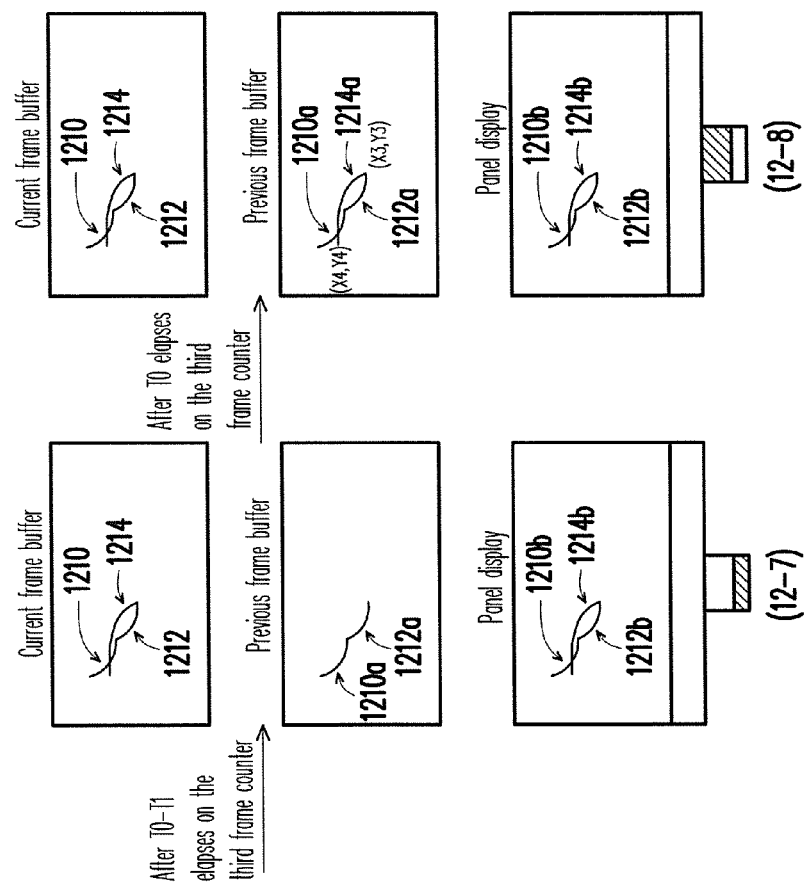

Then, referring to FIGS. 12A to 12C, they include FIGS. 12-1 to 12-8 for illustrating the contents stored in the current frame buffer 705 and the previous frame buffer 707 respectively, and the contents displayed on the panel in different stages in the case that the display control device 700 in FIG. 7 applies the process flow as shown in FIG. 8 according to an embodiment.

The illustration of FIGS. 12-1 to 12-5 relevant to the preceding stage of the display process is similar to the illustration of FIGS. 9-1 to 9-5 and FIGS. 11-1 to 11-5 respectively, and will not be repeated herein again for brevity. The difference mainly lies in the succeeding stage of the display process, that is, the relevant process flow denoted in FIGS. 12-6 to 12-8. In this embodiment, the updating of the previous frame buffer in the succeeding stage of the display process is performed by utilizing queues to re-draw all pixels on the line segments and then storing all pixels into the previous frame buffer 707, so the problem that the third line segment cannot be completely displayed in the embodiment of FIG. 11 does not occur.

Detailed illustration is given below. Referring to FIG. 12-6, when counting time of the first frame counter is equal to a complete update time T0, a first line segment 1210 has been completely displayed on a panel display, so the TCON uses the line segment algorithm to draw all pixels of the first line segment 1210 with starting point coordinates (X1, Y1) and end point coordinates (X2, Y2) of the first line segment 1210 stored in the first queue, and then it stores the display data into the previous frame buffer 707 at a corresponding address in sequence.

Because in this embodiment, all pixels on the first line segment 1210 are re-drawn according to the coordinate data stored in the queues, and then the display data on the first line segment 1210 is stored into the previous frame buffer 707, even if the first line segment 1210 and a third line segment 1214 are overlapping, the updated data still is only the display data of the first line segment 1210 itself. Accordingly, the display data of the third line segment 1214 is not updated as shown in FIG. 11-6.

Next, the comparison and displaying process for the second line segment 1212 and the comparison and displaying process for the third line segment 1214 still must be performed once and twice respectively, and the processes, as shown in FIGS. 12-7 and 12-8, are similar to those in the relevant illustration of FIGS. 9-7 and 9-8 respectively, and will not be described herein for brevity. However, since the third line segment 1214 is only stored in the current frame buffer 505 without being erroneously stored in the previous frame buffer 507, when the frame buffer comparison module 550 compares all image pixels in the current frame buffer 505 and the previous frame buffer 507, the pixel difference of a partial line segment of the third line segment 1214 can be correctly obtained by comparison. As a result, the third line segment can be further enhanced in color and hence completely displayed.

It should be noted that, in the above embodiments, after the display data of the current frame buffer and the display data of the previous frame buffer are compared, the driving data is obtained by referring to the LUT only after the comparison result indicates that they are not the same. However, it is one of the embodiments. In the other embodiments, it may be designed that the driving data is directly obtained according to the display data of the current frame buffer and the previous frame buffer in the LUT without comparison in advance. Moreover, the data may also be obtained without referring to the LUT. Any solution can be adopted as long as the driving data can be obtained according to the display data of the current frame buffer and the previous frame buffer in the solution.

Moreover, it should also be noted that, in one of the embodiments, queues are used to only store coordinate data of two endpoints of a line segment, and the algorithm module re-draws the entire line segment according to the coordinate data of the two endpoints of the line segment. However, in other embodiments, queues may used to store coordinate data of more than two points of a line segment, and the algorithm module may re-draw the entire line segment according to the coordinate data of these points. Moreover, queues are not limited to only storing coordinate data of part of points of a line segment. In other embodiments, the queues may further store other display data relevant to displaying (such as color-relevant data). In summary, any solution can be adopted as long as the queues are capable of storing part of display data of a line segment, and the line segment algorithm module reconstructs the entire line segment according to this part of display data.

In view of the above, in the embodiments, because the current frame buffer is updated by queue temporary storage and data reconstruction in the preceding stage of the display process, data may be processed in the pipeline parallel processing manner, which significantly improves the display speed and quality compared with the prior art. Moreover, in some of the embodiments, the previous frame buffer may be updated by queue temporary storage and data reconstruction likewise in the succeeding stage of the display process, so not only the display speed can be further increased, but also errors caused by overlapping image blocks due to input of a plurality of line segments can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control method for bi-stable displaying, comprising:
temporarily storing first display data of an image, wherein the image is input from a bi-stable panel, and the image comprises one or more line segments; and
performing parallel processing on the first display data of the respective one or more line segments, so as to generate driving data of the one or more line segments in parallel,
wherein the step of temporarily storing the first display data comprises temporarily storing the first display data belonging to the respective one or more line segments into one or more queues respectively, and the step of performing parallel processing comprises performing parallel processing on the first display data temporarily stored in the respective one or more queues.

2. The control method for bi-stable displaying according to claim 1, wherein the step of performing parallel processing on the first display data temporarily stored in the one or more queues so as to generate the driving data of the one or more line segments in parallel comprises:
updating a current frame buffer according to the first display data temporarily stored in the respective one or more queues respectively; and
every time after executing the step, generating the driving data according to display data stored in both the current frame buffer undergoing the updating this time and a previous frame buffer that is not updated yet.

3. The control method for bi-stable displaying according to claim 2, wherein the step of updating the current frame buffer comprises:
obtaining second display data according to the first display data temporarily stored in each one of the one or more queues respectively; and
every time after obtaining the second display data, storing the second display data obtained this time into the current frame buffer.

4. The control method for bi-stable displaying according to claim 3, wherein the first display data temporarily stored in the one or more queues comprises at least part of coordinate data of the respective one or more line segments respectively, and the second display data obtained every time comprises complete coordinate data of one of the one or more line segments.

5. The control method for bi-stable displaying according to claim 1, further comprising:
updating a previous frame buffer according to the first display data temporarily stored in the one or more queues.

6. The control method for bi-stable displaying according to claim 5, wherein the step of updating the previous frame buffer comprises:
obtaining third display data according to the first display data temporarily stored in the respective one or more queues respectively; and
every time after obtaining the third display data, storing the third display data obtained this time into the previous frame buffer.

7. The control method for bi-stable displaying according to claim 6, wherein the first display data temporarily stored in the one or more queues comprises at least part of coordinate data of the respective one or more line segments respectively, and the third display data obtained every time comprises complete coordinate data of one of the one or more line segments.

8. The control method for bi-stable displaying according to claim 7, wherein the first display data temporarily stored in the one or more queues comprises at least part of coordinate data of the respective one or more line segments respectively, and the third display data obtained every time comprises display data of an area surrounding one of the one or more line segments stored in the current frame buffer.

9. The control method for bi-stable displaying according to claim 1, wherein the driving data of each of the line segments is generated repeatedly, and repeated generation times of respective driving data of two consecutive line segments are overlapping.

10. A control method for bi-stable displaying, comprising:
receiving display data of a plurality of consecutive line segments from a bi-stable panel and generating corresponding driving data; and
displaying the one or more line segments on the bi-stable panel according to the driving data, wherein each of the one or more line segments is displayed repeatedly, and respective repeated display times of the two adjacent line segments are overlapping,
wherein each of the one or more line segments is displayed repeatedly for a complete update time, and an interval time of displaying the two adjacent line segments is less than the complete update time.

11. A timing controller (TCON), comprising:
a host interface, for receiving an image input from a bi-stable panel, wherein the image comprises one or more line segments;
a main control module, for temporarily storing first display data of the image, and performing parallel processing on the first display data of the respective one or more line segments, so as to generate driving data of the one or more line segments in parallel; and
a queue control module, for temporarily storing the first display data of the respective one or more line segments into one or more queues respectively, so that the main control module performs parallel processing on the first display data temporarily stored in the respective one or more queues.

12. The TCON according to claim 11, wherein the main control module further updates a current frame buffer according to the first display data temporarily stored in the respective one or more queues respectively, and the TCON further comprises a frame buffer comparison module for, every time after the main control module performing the updating, generating the driving data according to display data stored in both the current frame buffer undergoing the updating this time and a previous frame buffer that is not updated yet.

13. The TCON according to claim 12, further comprising a line segment algorithm module, for calculating second display data according to the first display data temporarily stored in one of the one or more queues respectively, so that the main control module updates the current frame buffer according to the second display data every time after the second display data is generated.

14. The TCON according to claim 12, wherein the first display data temporarily stored in the one or more queues comprises at least part of coordinate data of the respective one or more line segments respectively, and the second display data comprises complete coordinate data of the one or one of the more line segments.

15. The TCON according to claim 14, wherein the main control module further updates a previous frame buffer according to the first display data temporarily stored in the respective one or more queues.

16. The TCON according to claim 15, further comprising a line segment algorithm module, for calculating third display data of the image according to the first display data temporarily stored in one of the one or more queues respectively, so that the main control module stores the third display data into the previous frame buffer every time after the third display data is generated.

17. The TCON according to claim 16, wherein the first display data temporarily stored in the one or more queues comprises at least part of coordinate data of the respective one or more line segments respectively, and the third display data comprises complete coordinate data of one of the one or more line segments.

18. The TCON according to claim 16, wherein the first display data temporarily stored in the one or more queues comprises at least part of coordinate data of the respective one or more line segments respectively, and the third display data obtained every time comprises display data of an area surrounding one of the one or one of the more line segments stored in the current frame buffer.

19. The TCON according to claim 11, wherein the main control module repeatedly generates the driving data for each of the line segments in the image, and repeated generation times of the respective driving data of the two consecutive line segments in the image are overlapping.

20. A bi-stable display device, comprising the timing controller (TCON) according to claim 11, and a panel for repeatedly displaying each line segment in an image according to driving data generated by the TCON, wherein respective repeated display times of two consecutive line segments are overlapping.

21. A bi-stable display device, comprising:
a timing controller (TCON), for receiving display data of a plurality of line segments and generating corresponding driving data; and
a bi-stable panel, for receiving input of the plurality of line segments, and displaying the one or more line segments according to the driving data,
wherein the bi-stable panel repeatedly displays each of the one or more line segments, and respective repeated display times of two adjacent line segments are overlapping,
wherein each of the one or more line segments is displayed repeatedly for a complete update time, and an interval time between displaying of two adjacent line segments is less than the complete update time.

* * * * *